US010876036B2

(12) United States Patent
Kundu et al.

(10) Patent No.: US 10,876,036 B2
(45) Date of Patent: Dec. 29, 2020

(54) TEMPERATURE-STABLE PARAFFIN INHIBITOR COMPOSITIONS

(71) Applicant: ChampionX USA Inc., Sugar Land, TX (US)

(72) Inventors: Kousik Kundu, Houston, TX (US); Kim R. Solomon, River Falls, WI (US); Carter Silvernail, Burnsville, MN (US); Thomas O. Painter, Rosenberg, TX (US); David Fouchard, Sugar Land, TX (US)

(73) Assignee: ChampionX USA Inc., Sugar Land, TX (US)

( * ) Notice: Subject to any disclaimer, the term of this patent is extended or adjusted under 35 U.S.C. 154(b) by 0 days.

(21) Appl. No.: 15/399,080

(22) Filed: Jan. 5, 2017

(65) Prior Publication Data
US 2017/0190950 A1 Jul. 6, 2017

Related U.S. Application Data

(60) Provisional application No. 62/275,343, filed on Jan. 6, 2016.

(51) Int. Cl.
C10L 1/18 (2006.01)
C09K 8/524 (2006.01)
C10G 75/04 (2006.01)
C10G 29/22 (2006.01)
C10L 1/02 (2006.01)

(52) U.S. Cl.
CPC .............. C09K 8/524 (2013.01); C10G 29/22 (2013.01); C10G 75/04 (2013.01); C10L 1/02 (2013.01)

(58) Field of Classification Search
CPC .. C09K 8/524; C10M 2207/129; C10G 29/22; C10G 75/04; C10L 1/02
USPC ........................................................ 508/306
See application file for complete search history.

(56) References Cited

U.S. PATENT DOCUMENTS

| 2,981,684 | A | 4/1961 | Barnes et al. |
| 3,329,658 | A | 7/1967 | Fields |
| 3,378,488 | A | 4/1968 | Nimerick |
| 3,419,368 | A | 12/1968 | Leas |
| 3,770,055 | A | 11/1973 | Larsen |
| 4,110,283 | A | 8/1978 | Capelle |
| 4,663,491 | A | 5/1987 | Barthell et al. |
| 4,670,516 | A * | 6/1987 | Sackmann ............... C08F 8/32 525/327.6 |
| 4,900,331 | A | 2/1990 | Le |
| 4,906,682 | A | 3/1990 | Mueller et al. |
| 4,964,468 | A | 10/1990 | Adams et al. |
| 5,336,441 | A | 8/1994 | Shah et al. |
| 5,721,201 | A | 2/1998 | Tomassen et al. |
| 5,725,610 | A | 3/1998 | Vassilakis et al. |
| 5,756,004 | A | 5/1998 | Brezinski |
| 5,851,429 | A | 12/1998 | Magyar |
| 6,260,620 | B1 | 7/2001 | Furman et al. |
| 6,309,431 | B1 * | 10/2001 | Becker .................... C10L 1/143 44/393 |
| 6,365,067 | B1 | 4/2002 | Ahn et al. |
| 6,488,868 | B1 | 12/2002 | Meyer |
| 6,783,582 | B2 | 8/2004 | Goldman |
| 7,057,050 | B2 | 6/2006 | Meyer |
| 7,332,459 | B2 | 2/2008 | Collins et al. |
| 7,338,541 | B2 | 3/2008 | Connor et al. |
| 7,449,429 | B2 | 11/2008 | Goldman |
| 9,080,120 | B2 | 7/2015 | Adams et al. |
| 9,090,849 | B2 | 7/2015 | Adamczewska et al. |
| 9,120,885 | B2 | 9/2015 | Castro Sotelo et al. |
| 9,493,716 | B2 | 11/2016 | Burgazli et al. |
| 9,777,098 | B2 | 10/2017 | Eisenberg et al. |
| 2002/0166995 | A1 | 11/2002 | Robinson et al. |
| 2002/0193644 | A1 | 12/2002 | Feustel et al. |
| 2004/0110877 | A1 | 6/2004 | Becker |
| 2007/0213231 | A1 | 9/2007 | Jennings |
| 2007/0221539 | A1 | 9/2007 | Cohrs et al. |
| 2008/0078549 | A1 | 4/2008 | Moorehead et al. |
| 2010/0084612 | A1 | 4/2010 | Acosta et al. |
| 2010/0130385 | A1 | 5/2010 | Guzmann et al. |

(Continued)

FOREIGN PATENT DOCUMENTS

| CN | 103614128 A | 3/2014 |
| EA | 008243 B1 | 4/2007 |

(Continued)

OTHER PUBLICATIONS

International Search Report for International Application No. PCT/US2017/012265, dated Apr. 18, 2017, 3 pages.
Written Opinion for International Application No. PCT/US2017/012265, dated Apr. 18, 2017, 6 pages.
Dow P-Series Glycol Ethers, Product Information, (1992), 3 pages.
Lashkarbolooki et al, "Mitigation of Wax Deposition by Wax-Crystal Modifier for Kermanshash Crude Oil", Journal of Dispersion Science and Technology, vol. 32, No. 7, Jul. 2011, pp. 975-985.
Vertellus Specialties Inc., Citroflex Product Brochure, 16 pages, (2013).

(Continued)

Primary Examiner — Prem C Singh
Assistant Examiner — Francis C Campanell
(74) Attorney, Agent, or Firm — Kagan Binder, PLLC

(57) ABSTRACT

Disclosed are compositions including up to 20 wt % of a paraffin inhibiting polymer and one or more non-polymeric glycol ether compounds, wherein the compositions are stable and flow at a temperature between about 0° C. and −40° C., in many cases between about −20° C. and −40° C. The glycol ether compounds are non-polymeric, are liquids at 20° C. (1 atm) and have boiling points over 100° C., in many cases over 200° C. The compositions are useful paraffin inhibitor concentrates for use in the petroleum industry wherein the concentrates are stable, pumpable, and pourable at temperatures as low as −40° C. and as high as 60° C.

8 Claims, No Drawings

(56) References Cited

U.S. PATENT DOCUMENTS

| | | | |
|---|---|---|---|
| 2013/0156638 A1 | 6/2013 | Hellberg et al. | |
| 2014/0165457 A1* | 6/2014 | Castro | C08F 255/026 |
| | | | 44/393 |
| 2014/0273150 A1* | 9/2014 | Angel | C02F 3/342 |
| | | | 435/186 |
| 2015/0011453 A1 | 1/2015 | Bennett et al. | |
| 2015/0038470 A1 | 2/2015 | Keasler et al. | |
| 2017/0152201 A1 | 6/2017 | Becker et al. | |
| 2017/0306502 A1 | 10/2017 | Moloney et al. | |

FOREIGN PATENT DOCUMENTS

| | | |
|---|---|---|
| RU | 2014347 C1 | 6/1994 |
| RU | 2128210 C1 | 3/1999 |
| RU | 2009141773 A | 5/2011 |
| RU | 2515238 C2 | 5/2014 |
| WO | 0104238 A1 | 1/2001 |
| WO | 03/042428 A1 | 5/2003 |
| WO | 2005098200 A2 | 10/2005 |
| WO | 2012/013432 A1 | 2/2012 |

OTHER PUBLICATIONS

Hallstar Technical Publication, "The Function and Selection of Ester Plasticizers," 26 pages.
Eastman Chemical Company, "Plasticizer formulation selector guide", Technical Tip, 4 pages, (2014).
Hallstar, Ester Plasticizers for Elastomers, Hallstar Elastomer Brochure, 26 pages (2013).
Hallstar, "Plasticizer/Polymer Polarity Chart," 4 pages.
George Wypych, "Plasticizers Use and Selection for Specific Polymers," Chapter 11, 107 pages, 2012.
Stephen O'Rourke, Hallstar Technical Publication, "High Performance Ester Plasticizers," (2001) 17 pages.
Wesley H. Whittington, Hallstar Technical Publication, "Ester Plassticizers for Polar Elastomers with Emphasis on Low-Temperature," 12 pages, (1983).
European Search Report for EP Application No. 17736295.1, dated May 28, 2019, 7 pages.
European Search Report for EP Application No. 17736294.4, dated May 28, 2019, 7 pages.
Johannes Fink, Demulsifiers, Petroleum Engineer's Guide to Oil Field Chemicals and Fluids, Second Edition, p. 792 (2015).
Russian Office Action & Search Report in Russian Application No. 2018128382, dated May 27, 2020, 11 pages (5 pages English Translation, 6 pages Official Copy).

* cited by examiner

TEMPERATURE-STABLE PARAFFIN INHIBITOR COMPOSITIONS

FIELD OF THE INVENTION

The present invention generally relates to temperature stable paraffin inhibitor compositions.

BACKGROUND

Crude oil products are globally obtained from subterranean reservoirs using techniques such as drilling and hydraulic fracturing. Transportation of crude oil products from the subterranean reservoir, required to process, i.e. refine, the crude oil, is accomplished by moving the crude oil through pipes and into storage/transportation means such as rail cars, tanks, and the like. During the moving, production, and/or storage, the crude is often subjected to ambient temperatures between −40° C. and 60° C.

Crude oil products include linear and branched alkanes having the general formula $C_nH_{2n+2}$ wherein n is typically about 1-50, although minor amounts of longer hydrocarbon chains do occur. The higher molecular weight alkanes can be problematic in that their melting points tend to be greater than ambient temperatures in some cases. For example, nonadecane has a melting point of 33° C.; higher alkanes can have melting points in excess of 60° C. for example.

The high melting alkane fractions lead to formation of paraffinic residue that solidifies and deposits on the sides and bottoms of pipes, storage vessels, and transportation vessels (rail cars, ocean tankers, etc.). The solidified paraffinic residue, also known as "paraffin wax", not only reduces the effective volume of the structure it is contained within but also represents a loss of a valuable component from the body of the crude oil. Paraffin wax build up, especially excessive paraffin wax buildup reduces the efficiency of transporting crude oil and leads to increased costs related to added downtime for cleaning of the pipes and/or vessels as well as disposal of residues removed from the vessel which increase environmental burden. While the pipelines and vessels can be cleaned to remove the paraffinic residue, the process generates hazardous waste, takes the vessel out of service during the cleaning period, and is expensive.

The formation of paraffin wax can be reduced by "paraffin inhibitors" (PI) which interfere with the crystallization process of wax and/or suspend wax crystals in the oil. The addition of PI to the crude oil is effective in dispersing the paraffinic residue, thereby reducing the formation of residues in the pipelines and vessels to the benefit of the oil and gas industry. The PI effectively reduces the formation of paraffinic residues during storage and transportation of the crude oil products, mitigating economic loss and decreasing environmental impact.

Typical paraffin inhibitor polymers include, e.g. ethylene polymers and copolymers thereof with vinyl acetate, acrylonitrile, or α-olefins such as octene, butene, propylene, and the like; comb polymers with alkyl side chains such as methacrylate ester copolymers, maleic-olefinic ester copolymers, and maleic-olefinic amide copolymers; and branched copolymers having alkyl side chains such as alkylphenol-formaldehyde copolymers and polyethyleneimines.

Nonaqueous formulations including such paraffin inhibitors as concentrate ("PIC") must also be transported to, and stored at the field locations where crude oil is recovered so that it can be applied as needed to the contents of the pipes, vessels, and the like. Providing PIC in a fluid format—i.e. in solution or dispersion—is highly advantageous for applying PI in the field because pumping equipment suitable to meter the desired amount of PI into a pipe or vessel is readily available. However, severe dispensing and usage problems are associated with the use of nonaqueous paraffin inhibitor concentrates (PIC) in areas where the winter temperature goes well below 0° C. In some field locations, for example, a winter temperature of −10° C. or less, −20° C. or less, −30° C. or less, or even −40° C. or less is not unusual. In such temperatures, PICs tend to form a gel or a solid (with the PI polymer solidifying or precipitating from the PIC liquid) with decreasing temperature, leading to the aforementioned severe dispensing and usage problems.

Previous solutions to the problem of PIC solidification include the addition of low-boiling solvents, such as methanol, to the PIC compositions. However, use of such solvents pose a different problem: at higher temperatures they can have a substantial vapor pressure. While cold temperatures are of concern to crude oil field operations, temperatures of up to about 60° C. are also encountered—often at the same field locations, depending on the seasonal weather patterns. It would be advantageous to provide additives for PIC that reduce the formation of solids therein from −40° C. to 60° C., thereby allowing the pumping of the PIC in the field within this temperature range and without buildup of high vapor pressure at the upper end of the range.

SUMMARY OF THE INVENTION

A paraffin inhibitor concentrate (PIC) composition that is a flowable and stable liquid at low temperatures is provided for reducing paraffin or wax deposition in a crude oil storage or transportation vessel upon dilution. The paraffin inhibitor concentrate (PIC) composition comprises, consists essentially of, or consists at least of one paraffin inhibitor (PI) and at least one nonpolymeric glycol ether compound. A general structure for the glycol ethers herein may be:

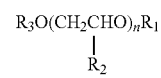

wherein n=1 to 3; $R_1$=$C_1$-$C_6$ alkyl or phenyl group; $R_2$=H or methyl; and $R_3$=H or alkyl.

In some embodiments, the PIC compositions herein comprise, consist essentially of, or consist of a PI; one or more glycol ethers; one or more long chain ($C_8$-$C_{30}$) fatty alcohols; one or more low molecular weight alcohols ($C_1$-$C_8$); an aromatic solvent; a low polarity solvent (e.g., toluene, HAN, etc.); or a mixture of two or more of any of the foregoing, where the PIC remains a stable composition at −40° C. (e.g., the PI polymer remains in solution or is soluble enough in solution to remain therein upon filtering through a filter having a 10 μm or 100 μm average pore size).

The glycol ether compound is a solvent which includes at least one ether moiety and in some embodiments two or more ether moieties, wherein the glycol ether compound is non-polymeric with a molecular weight of 260 or less and each glycol ether has an alkyl substituent having 6 carbons or less and the overall compound has 15 or fewer carbon atoms therein. In embodiments, the PIC compositions are nonaqueous compositions. In embodiments, each of the components of the compositions are in stable solution and flow at a temperature between about 0° C. and −40° C., or lower.

In some embodiments, the non-polymeric glycol ether compound is a liquid at 20° C. at atmospheric pressure and has a boiling point greater than 100° C., or greater than 200° C. at atmospheric pressure.

In some embodiments, the glycol ether compound is ethylene glycol methyl ether, ethylene glycol ethyl ether, ethylene glycol propyl ether, ethylene glycol butyl ether, ethylene glycol hexyl ether, diethylene glycol methyl ether, diethylene glycol ethyl ether, diethylene glycol propyl ether, diethylene glycol butyl ether, diethylene glycol hexyl ether, triethylene glycol methyl ether, triethylene glycol ethyl ether, triethylene glycol propyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, tripropylene glycol methyl ether, tripropylene glycol ethyl ether, ethylene glycol phenyl ether, propylene glycol phenyl ether, or a mixture of two or more thereof.

In some embodiments, the PIC composition comprises about 1 wt % to 99 wt % of the one or more glycol ether compounds or mixture thereof. In some embodiments, the composition comprises about 5 wt % to 75 wt % of one or more glycol ether compounds or mixture thereof. In some embodiments, the composition further comprises a refined petroleum solvent. In some embodiments, the composition further comprises one or more surfactants. In some embodiments, the composition comprises about 10 wt % to 20 wt % of the one or more surfactants. In some embodiments, the one or more surfactants comprise an alcohol alkoxylate having 20 or more total carbon atoms, the alcohol comprising a linear, branched, aromatic, or alkaromatic hydrocarbyl group having about 8 to 30 carbons and the alkoxylate comprising about 3 to 70 alkoxylate repeat units. In some embodiments, the alkoxylate is selected from ethoxylate, propoxylate, or a combination thereof.

In some embodiments, the composition comprises about 1 wt % to 20 wt % of a paraffin inhibiting polymer. In some embodiments, the paraffin inhibiting polymer comprises a copolymer comprising the residues of one or more alpha olefin monomers and a maleic anhydride monomer, the one or more alpha olefin monomers having the formula (I):

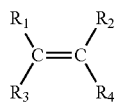
(I)

wherein $R_1$, $R_2$, $R_3$, and $R_4$ are independently selected from hydrogen and $C_5$-$C_{60}$ alkyl, with the proviso that at least two thereof are hydrogen; the alkyl maleic anhydride monomer having the formula (II):

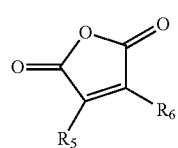
(II)

wherein $R_5$ and $R_6$ are independently selected from hydrogen or $C_1$-$C_{30}$ alkyl. In some embodiments, the maleic anhydride residue is further reacted with about 0.01 to 2.0 equivalents of a $C_{12}$-$C_{60}$ alkanol or amine per equivalent of anhydride. In some embodiments, the paraffin inhibiting polymer comprises an ethylene-vinyl acetate copolymer. In some embodiments, the paraffin inhibiting polymer comprises an alkylphenol-formaldehyde copolymer. In some embodiments, the paraffin inhibiting polymer comprises an acrylate and/or methacrylate (co)polymer.

A composition is provided comprising, consisting essentially of, or consisting of a crude oil source and a nonaqueous liquid composition comprising a solubilized paraffin inhibiting polymer and a non-polymeric glycol ether compound, wherein the nonaqueous liquid composition is a stable mixture that flows at a temperature between about 0° C. and −40° C., and wherein the paraffin inhibiting polymer is present in the crude oil source at about 5 ppm to 10,000 ppm (parts by weight).

A composition is provided in a kit, the kit comprising, consisting essentially of, or consisting of a nonaqueous liquid composition including a solubilized paraffin inhibiting polymer and a non-polymeric glycol ether compound, wherein the nonaqueous liquid composition is a stable mixture that flows at a temperature between about 0° C. and −40° C.; a container to hold said nonaqueous liquid composition at temperatures between about 60 C and −40 C; and instructions for use of the nonaqueous liquid composition.

A method is provided comprising, consisting essentially of, or consisting of forming a nonaqueous liquid composition comprising a solubilized paraffin inhibiting polymer and a non-polymeric glycol ether compound and the composition is a stable mixture that flows at a temperature between about 0° C. and −40° C.; storing the composition in an enclosed container at a first temperature between about −40° C. and 60° C.; removing the composition from the container at a second temperature between about −40° C. and 60° C.; and applying the composition to a crude oil source, wherein the removing and the applying are accomplished using a mechanical pump. In some such embodiments, the first temperature, the second temperature, or both, are between about −40° C. and −20° C.

Other objects and features will be in part apparent and in part pointed out hereinafter.

DETAILED DESCRIPTION

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used herein, the term "glycol ether compound" means a non-polymeric compound having a molecular weight of about 260 or less and at least one glycol ether moiety and an alkyl substituent having 6 carbons or less and the overall compound having about 15 carbon atoms total or less, for example in some embodiments one glycol ether moiety, in other embodiments two glycol ether moieties, in still other embodiments three glycol ether moieties.

As used herein, the term "non-polymeric" refers to a compound characterized as having 0 to about 3 covalently bonded repeating units and a molecular weight of less than 1000.

As used herein, the term "PIC" or "PIC composition" means a mixture or composition of at least one PI polymer and at least one additive (e.g., one or more glycol ethers, an alcohol, a surfactant, etc.). Optionally, a PIC may include one or more solvent(s) (e.g., a refined petroleum solvent), surfactant(s), biocide(s), preservative(s), or stabilizer(s), as disclosed herein below.

As used herein, the term "additive" means a solvent composition which may include a glycol ether compound, a mixture of two or more glycol ether compounds, or at least one glycol ether compound and at least one synergistic component (e.g., an alcohol, HAN, etc.). An additive may include at least one surfactant, biocide, preservative, or stabilizer, as disclosed herein below.

As used herein, the term "synergistic component" has the meaning of an activating and/or enhancing component (e.g., analogous to an adjuvant or potentiator in medical or biological contexts) configured to increase the effect of the one or more glycol ether compounds as a solidification point depressant for the PIC.

As used herein, the term "nonaqueous" means substantially excluding water.

As used herein, the term "liquid", "flows", or "flow" referring to a composition of the invention means that 10 mL of the composition vertically at rest on a substantially horizontal surface in a cylindrical container having dimensions of radius 1 inch and height 2 inches flows observably within about 10 seconds when tipped to a substantially horizontal position. In some embodiments, "liquid", "flows", or "flow" referring to a composition of the invention means a composition that has a Brookfield viscosity at $10\ s^{-1}$ of about 5 cP to 1000 cP.

As used herein, the term "crude oil" or "crude oil source" or "crude oil product" means the hydrocarbon product of a subterranean reservoir, wherein the product is a liquid or a solid at 20° C. under a pressure of 1 atm, the product including at least linear and branched alkanes having the general formula $C_nH_{2n+2}$ wherein n is typically about 1-50, and can be greater than 50.

As used herein, the term "solidification point" means the temperature at which a composition no longer pours or flows. Likewise, "solidified" refers to a composition that does not flow, and "solidification" refers to the process or state of being solidified.

As used herein, the terms "stable" as used in conjunction with the terms "composition," "mixture," "liquid," and "solution" mean a liquid composition (e.g., solution) having at least a paraffin inhibiting polymer, one or more solvents, and one or more additives, wherein the paraffin inhibiting polymer component therein remains sufficiently soluble such that at least 50 (wt. or vol.)% of the total amount of paraffin inhibiting polymer initially added to the PIC remains in the solution (e.g., PIC) upon filtering through a filter having a 10 µm, 100 µm, or 1000 µm average pore size.

As used herein, the terms "soluble" or "in solution" as used in conjunction with any of the paraffin inhibiting polymers or PICs disclosed herein refers to maintaining, or, the state of the polymer being in small enough particulate form—while dispersed in the other components of a PIC (e.g., solvent(s))—to allow at least 50 (wt. or vol.)% of the total amount of paraffin inhibiting polymer initially added to the PIC to pass through a filter having a 10 µm, 100 µm, or 1000 µm average pore size.

As used herein, the terms "comprise(s)," "include(s)," "having," "has," "can," "contain(s)," and variants thereof, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of," and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the teen "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of nonlimiting examples thereof, flexibility, partition coefficient, rate, solubility, temperature, and the like; intended values include thickness, yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

DISCUSSION

Paraffin Inhibitor Concentrates (PIC)

Disclosed herein are temperature stable paraffin inhibitor concentrate (PIC) compositions and methods for inhibiting solidification in paraffin inhibitor concentrates (and the PI polymers therein) at temperatures encountered during storage and/or transportation thereof, e.g. about −40° C. to 60° C. The temperature stable paraffin inhibitor concentrates are stable mixtures that flow, and thus are pourable or pumpable, at temperatures as low as −40° C. or below, or about 0° C. to −40° C., or about −5° C. to −40° C., or about −10° C. to −40° C., or about −15° C. to −40° C., or about −20° C. to −40° C., or about −25° C. to −40° C., or about −30° C. to −40° C. and do not undergo observable phase separation at such temperatures. In some embodiments, the compositions further do not phase separate or solidify upon subsequent warming to 20° C., or as high as 60° C. In some embodiments, the warmed compositions remain stable mixtures, in a single phase. In some embodiments, the compositions have a homogeneously dispersed or emulsified phase substantially over the temperature range of −40° C. to 60° C.

In some embodiments, the PIC compositions of the invention are nonaqueous. In other embodiments, the PIC compositions include up to about 10 wt % water, or up to about 9% water, or up to about 8% water, or up to about 7% water, or up to about 6% water, or up to about 5% water, or up to about 4% water, or up to about 3% water. In embodiments, the PIC compositions are characterized as having a substantially transparent, homogeneous appearance at least at one selected temperature between about 0° C. and 20° C., for example at 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., or 20° C.

Conventional PICs comprise, consist essentially of, or consist of a paraffin inhibitor (PI) and one or more petroleum-based solvents, optionally including a low-boiling cosolvent such as methanol, or one or more surfactants, or both. Typically, the PI is a polymer such as a branched or comb-like polymer. Suitable PI include, e.g. ethylene polymers and copolymers thereof with vinyl acetate, acrylonitrile, or α-olefins such as octene, butene, propylene, and the like; comb polymers with alkyl side chains such as methacrylate ester copolymers, maleic-olefinic ester copolymers, and maleic-olefinic amide copolymers; and branched copolymers having alkyl side chains such as alkylphenol-formaldehyde copolymers (e.g., a formaldehyde-phenolic resin) and polyethyleneimines. In some embodiments, the PI comprises a copolymer comprising the residues of (i) an alpha olefin monomer and a maleic anhydride monomer or (ii) a maleic anhydride monomer and styrene. The alpha olefin monomer has the formula (I):

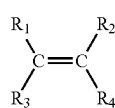

(I)

wherein $R_1$, $R_2$, $R_3$, and $R_4$ are independently selected from hydrogen and $C_5$-$C_{60}$ alkyl, with the proviso that at least two thereof are hydrogen; a blend of two or more such alpha olefin monomers having formula (I) are suitably included in the copolymer. In some embodiments $R_1$, $R_2$, $R_3$, and $R_4$ are independently hydrogen or $C_{12}$-$C_{60}$. The maleic anhydride monomer has the formula (II):

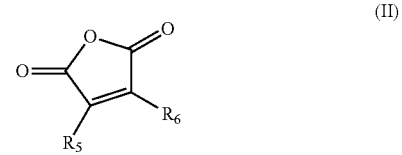

(II)

wherein $R_5$ and $R_6$ are independently hydrogen or $C_1$-$C_{60}$ alkyl. In some embodiments $R_5$ and $R_6$ are independently hydrogen or $C_{12}$-$C_{30}$.

In some embodiments, the copolymer of (I) and (II) is further reacted via the maleic anhydride residue with one or more alkanol or amine compounds to form the corresponding carboxylate or amide functionalities. In some such embodiments, the maleic anhydride residue is reacted with about 0.5 to 2.0 equivalents of the alkanol or amine per equivalent of anhydride. The alkanol or amine compounds are linear, branched, aromatic, or alkaromatic compounds having about 12 to 60 carbons.

In some embodiments, polymers that are paraffin inhibitors for crude oil also have additional utility as asphaltene dispersants, pour point depressants, flow improvers, and may provide other crude oil benefits known to one skilled in the art. Therefore, in some embodiments the PIC provides a benefit to crude oil as not only paraffin inhibitor but also as an asphaltene dispersant, pour point depressant, and flow improver and may also provide other crude oil benefits known to one skilled in the art.

Conventionally, the PI polymer is present in the PIC typically at about 1 wt % to 5 wt %, for example about 2 wt % to 3 wt % and is diluted in the field to about 50 ppm to 10,000 ppm PI (or with the PICs disclosed herein even as little as 5 ppm to 10,000 ppm) by adding the PIC into a crude oil source, often along with one or more additional additives to accomplish e.g. biocidal activity, corrosion resistance, and the like. Petroleum-based solvents that conventionally provide the balance of PIC compositions comprise, consist essentially of, or consist of a refined petroleum distillates or solvents. Refined petroleum distillates or solvents comprise, consist essentially of, or consist of aromatic compounds such as benzene, toluene, xylene, light aromatic naphtha, heavy aromatic naphtha (HAN), or kerosene; and/or aliphatic compounds such as pentane, hexane, heptane, octane, nonane, decane, undecane, dodecane, tridecane, tetradecane, pentadecane, hexadecane, or any of their cyclic or branched isomers or a mixture thereof. Naphtha is a petrochemical industry term describing boiling point fractions of petroleum distillate collected at different points on a distillation column. Naphtha fractions may include linear or branched or cyclic alkanes or alkenes, aromatic hydrocarbons, or fused ring aromatic compounds or mixtures of these materials. Light naphtha is lower boiling material collected near the top portion of the distillation column; medium naphtha higher boiling material from near the middle. Heavy naphtha is an even higher boiling material from near the bottom portion of the column. PI polymer solubility, particularly at temperatures below 20° C., limits the amount of polymer that can be delivered in such concentrates. PI polymers may precipitate out of a PIC at temperatures below about 20° C., such as below about 0° C., or below about −20° C., or below about −40° C.

In some embodiments, the PICs of the invention are non-aqueous compositions; that is, they are characterized by the substantial absence of water and are formed by substantially excluding water. The PICs of the invention are liquids and stable mixtures at −40° C., such as between about −40° C. to 60° C., or about −40° C. to 0° C., or about −40° C. to −20° C., or about −40° C. to −10° C. By "liquid" it is meant that the PICs of the invention flow and by "stable liquid" it is meant that at least 50 wt % (or vol %) of the PI polymer in the PIC remains soluble such that the PI polymer would not be removed from the PIC through a filter having a 1000 µm average pore size (in some embodiments a 100 µm average pore size or a 10 µm average pore size). Further, the PICs having the additives disclosed herein may maintain the PI polymer in stable solution at temperatures below about −40° C. In some embodiments, even when the PICs herein become hazy or translucent at lower temperatures, the PI polymer remains therein in a substantially homogenous stable solution (e.g., no precipitate or solid is observed).

In embodiments, the PICs of the invention comprise up to 20 wt % PI polymer, since the solubility (and stability) of the PI in the PIC at temperatures below 20° C. is increased by the addition of the additive(s) of the invention. Thus, in embodiments, the PIC of the invention comprise, consist essentially of, or consist of about 1 wt % to 20 wt % PI, or about 3 wt % to 20 wt %, or about 5 wt % to 20 wt %, or about 7 wt % to 20 wt %, or about 10 wt % to 20 wt % PI, or about 1 wt % to 10 wt % PI, or about 1 wt % to 7 wt % PI, or about 1 wt % to 5 wt % PI, or about 2 wt % to 6 wt % PI, or about 3 wt % to 8 wt % PI, or about 8 wt % to about 12 wt % PI, or about 8 wt % to about 10 wt % PI, or about 10 wt % to about 15 wt % PI, or about 12 wt % to about 18 wt % PI.

In embodiments, the PIC of the invention may comprise about 1 wt % to 99 wt % of the one or more additives including one or more non-polymeric glycol ether compounds and optional synergizing components described herein or a mixture of two or more thereof. For example, the PICs of the invention may comprise greater than 0 wt % to about 90 wt % of each individual additive (e.g., a glycol ether) of the one or more additives, or greater than 0 wt % to about 75 wt %, or greater than 0 wt % to about 50 wt %, or greater than 0 wt % to about 30 wt %, or greater than 0 wt % to about 20 wt %, or greater than 0 wt % to about 10 wt %, or greater than 0 wt % to about 5 wt %, or about 1 wt % to about 50 wt %, or about 10 wt % to about 40 wt %, or about 10 wt % to about 20 wt %, or about 1 wt % to about 10 wt %, or about 1 wt % to about 6 wt %, or about 2 wt % to about 10 wt %, or about 2 wt % to about 5 wt % of each individual additive of the one or more additives. In some embodiments, the PICs of the invention may comprise about 2 wt % to about 80 wt % of one or more additives collectively, such as about 2 wt % to 75 wt %, or about 5 wt % to 60 wt %, or about 10 wt % to about 20 wt %, or about 15 wt % to about 35 wt %, or about 30 wt % to about 50 wt %, or about 10 wt % to 75 wt %, or about 40 wt % to 60 wt %, or about 50 wt % to 75 wt %, or about 30 wt % to 80 wt %, or about 25 wt % to 50 wt %, or about 25 wt % to 75 wt % of the one or more additives, collectively. In some embodiments, the balance of the PIC includes one or more PI polymers; a petroleum-based solvent (e.g., a petroleum distillate) such as benzene, toluene, xylene, or naphtha (e.g., HAN); and/or one or more surfactants (e.g., nonylphenol ethoxylate, dodecylbenzene sulfonic acid, or cocodiethanolamide)). In some embodiments, the PIC is characterized by the substantial absence of a petroleum-based solvent. In some embodiments, the PIC includes one or more additional components such as surfactants, biocides, preservatives, stabilizers, or synergizing components, and the like without limitation.

In some embodiments, the refined petroleum distillate or solvent (e.g., naphtha or HAN) may be present in the PIC in an amount of about 0 wt % to about 90 wt % of the PIC, such as about 10 wt % to about 90 wt %, or about 25 wt % to about 85 wt %, or about 30 wt % to about 80 wt %, or about 40 wt % to about 70 wt %, or about 60 wt % to about 90 wt %, or about 70 wt % to about 90 wt %, or about 65 wt % to about 85 wt %, or about 60 wt % to about 80 wt %, or about 50 wt % to about 75 wt %, or about 50 wt % to about 67 wt %, or about 40 wt % to about 60 wt %, or about 30 wt % to about 50 wt %, or about 20 wt % to about 40 wt %, or about 20 wt % to about 30 wt %, or about 25 wt % to about 28 wt %, or about 15 wt % to about 35 wt %, or about 10 wt % to about 30 wt %, or about 10 wt % to about 55 wt %, or about 5 wt % to about 20 wt %, or more than about 50 wt %, or more than about 60 wt % of the PIC. In such embodiments, the balance of the PIC may include the PI polymer and additive(s) in any of the respective amounts disclosed herein. Additionally, the PIC may optionally include one or more surfactants, biocides, stabilizers, preservatives, or synergizing components as disclosed herein below.

Optionally, the PIC further comprises one or more surfactants. In an embodiment, the one or more surfactants are nonionic and/or amphoteric surfactants and/or anionic surfactants. The PIC in such embodiments may comprise about 0 wt % to 10 wt % of each species of a nonionic, amphoteric, or anionic surfactant, or about 0.5 wt % to 10 wt %, or about 1 wt % to 10 wt %, or about 2 wt % to 10 wt %, or about 3 wt % to 10 wt %, or about 4 wt % to 10 wt %, or about 5 wt % to 10 wt %, or about 4 wt % to about 7 wt %, or about 5 wt % to about 6 wt %, or about 2.5 wt % to about 4 wt %, or about 3 wt % to about 3.5, wt %, or about 0.5 wt % to 9 wt %, or about 0.5 wt % to 8 wt %, or about 0.5 wt % to 7 wt %, or about 0.5 wt % to 6 wt %, or about 0.5 wt % to 5 wt %, or about 0.5 wt % to 4 wt %, or about 0.5 wt % to 3 wt %, or about 0.5 wt % to 2 wt %, or about 0.5 wt % to 1 wt %, or about 1 wt % to 8 wt %, or about 1 wt % to 5 wt %, or about 1 wt % to about 2 wt %, or about 1.5 wt % nonionic, amphoteric, or anionic surfactant. The PIC in such embodiments may comprise greater than about 0 wt % to about 40 wt % total nonionic, amphoteric, and/or anionic surfactant(s), or about 0.5 wt % to 30 wt %, or about 1 wt % to 25 wt %, or about 5 wt % to 30 wt %, or about 5 wt % to 25 wt %, or about 10 wt % to 25 wt %, or about 10 wt % to 20 wt %, or about 15 wt % to about 30 wt %, or about 18 wt % to about 22 wt %, or about 20 wt % nonionic, amphoteric, and/or anionic surfactant(s).

Nonionic surfactants useful in the PIC include but are not limited to alkoxylated alcohols having 20 or more carbon atoms therein (as distinguished from the glycol ether additives (e.g., solvents) herein that have 15 or less total carbon atoms), such as copolymers of ethylene oxide and/or propylene oxide and/or butylene oxide and epoxylated, propoxylated, and epoxylated-propoxylated compounds comprising derivatives of $C_8$-$C_{40}$ alkanols or derivatives of $C_8$-$C_{30}$ alkanols. Suitable alkanols include linear, branched, aromatic, or alkaromatic alkanols. In some embodiments, the alkoxylated alcohols comprise about 3 to 100 alkoxylate repeat units, or about 3 to 90, or about 3 to 80, or about 3 to 70, or about 3 to 60, or about 3 to 50, or about 3 to 40, or about 3 to 30 alkoxylate repeat units. In some embodiments the alkoxylate repeat units are selected from ethoxylate, propoxylate, or a combination thereof in random or block configuration. In many embodiments, a blend of two or more alkoxylated alcohol surfactants are employed in the PIC. In some embodiments, suitable non-ionic surfactants may include the $C_8$-$C_{24}$ or $C_{14}$-$C_{24}$ reaction product of a fatty acid conjugated with an ethanolamine, such as cocodiethanolamide. Other nonionic surfactants are similarly useful in the PIC of the invention and are not particularly limited. Some examples of suitable nonionic surfactants include alkylphenol alkoxylates (e.g., nonylphenol ethoxylate), block copolymers of ethylene, propylene and butylene oxides, alkyl polyglucosides, polyalkoxylated glycerides, sorbitan esters and polyalkoxylated sorbitan esters, and alkoyl polyethylene glycol esters and diesters.

Some examples of suitable amphoteric surfactants include alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, betaines, sultaines, alkyl amphoacetates and amphodiacetates, alkyl amphopropionates and amphodipropionates, dodecylbenzene sulfonic acid, and alkyliminodipropionate. Blends of nonionic and/or amphoteric surfactants, including blends of any of the above recited surfactants, may also be usefully employed in the PIC(s) disclosed herein.

Some examples of suitable anionic surfactants include alkylbenzene sulfonates, alkyldiphenoxyether sulfonates and disulfonates, napthalene sulfonates, linear and branched alkyl sulfonates, fatty alcohol sulfates, fatty alcohol ether sulfates, linear and branched alpha olefin sulfonates. Blends of nonionic and/or amphoteric surfactants with anionic surfactants, including blends of any of the above recited surfactants, are also usefully employed in the PIC of the invention.

Paraffin Inhibitor Concentrate (PIC) Additives

It has been discovered that specific amounts and types of polar non-polymeric ether (e.g., glycol ether) compounds having 15 or less total carbon atoms therein and in some cases one or more synergizing components, are useful as additives in nonaqueous PICs to increase stability and reduce or eliminate the solidification of specific PIs (paraffin inhibitors) and PICs comprising the same at low temperatures (e.g., about 0° C. to about −40° C. or at about −40° C.). Glycol ether compounds having melting points of less than about 20° C., boiling points greater than 100° C., and low vapor pressure at 60° C. are especially useful as additives to PICs to reduce or eliminate the solidification of the PI temperatures between about 0° C. to −40° C. (−40° F.), for example about −10° C. to −40° C., or about −20° C. to −40° C., or −30° C. to −40° C., or even below −40° C. while providing compositional stability to temperatures up to 60° C.

The PIC additives ("additives") may include one or more such polar non-polymeric glycol ether compounds having 15 or less total carbon atoms therein. In some embodiments the glycol ether compound may have 12 or less total carbon atoms therein, such as 10 or less, 9 or less, or 6 or less total carbon atoms therein. Exemplary glycol ether compounds include the formula $HO(CH_2CH(R_2)O)_nR_1$, where n=1-3; $R_1$=$C_1$-$C_6$ alkyl group or phenyl group; and $R_2$=H or a methyl group. Exemplary classes of glycol ether compounds include ethylene and propylene glycol ethers. For example, exemplary glycol ether compounds may include an ethylene glycol monoalkyl ether, ethylene glycol dialkyl ether, propylene glycol monoalkyl ether, propylene glycol dialkyl ether, or mixtures including of any of the forgoing.

Exemplary (non-polymeric) glycol ethers include ethylene glycol methyl ether, ethylene glycol ethyl ether, ethylene glycol propyl ether, ethylene glycol butyl ether, ethylene glycol pentyl ether, ethylene glycol hexyl ether, diethylene glycol methyl ether, diethylene glycol ethyl ether, diethylene glycol propyl ether, diethylene glycol butyl ether, diethylene glycol pentyl ether, diethylene glycol hexyl ether, triethylene glycol methyl ether, triethylene glycol ethyl ether, triethylene glycol propyl ether, triethylene glycol butyl ether, triethylene glycol pentyl ether, triethylene glycol hexyl ether, propylene glycol methyl ether, propylene glycol ethyl ether, propylene glycol propyl ether, propylene glycol butyl ether, propylene glycol pentyl ether, propylene glycol hexyl ether, dipropylene glycol methyl ether, dipropylene glycol ethyl ether, dipropylene glycol propyl ether, dipropylene glycol butyl ether, dipropylene glycol pentyl ether, dipropylene glycol hexyl ether, tripropylene glycol methyl ether, tripropylene glycol ethyl ether, tripropylene glycol propyl ether, tripropylene glycol butyl ether, tripropylene glycol pentyl ether, tripropylene glycol hexyl ether, ethylene glycol phenyl ether, diethylene glycol phenyl ether, triethylene glycol phenyl ether, propylene glycol phenyl ether, dipropylene glycol phenyl ether, tripropylene glycol phenyl ether, and mixtures including one or more of any of the foregoing.

In some embodiments, the additive comprises, consists essentially of, or consists of one or more glycol ethers and one or more synergizing components (e.g., components which serve to activate or enhance the solidification point depressing ability of the glycol ether). Suitable synergizing components may comprise, consist essentially of, or consist of one or more long chain ($C_8$-$C_{30}$) fatty alcohols; one or more low molecular weight alcohols ($C_1$-$C_7$) and an aromatic solvent (e.g., toluene, xylene, etc.); a low polarity solvent such as a refined petroleum solvent or distillate (e.g., HAN); or a mixture of two or more of any of the foregoing. Specific mixtures (e.g., combinations and/or amounts of specific glycol ethers and synergizing components) of the above are shown herein to depress the solidification point of PICs to at least −40° C., while similar mixtures do not have the desired effect. The mixtures herein may depress the solidification point of PICs stored at −40° C. effective to maintain each component therein (e.g., the PI polymer) in stable solution for weeks or even months at −40° C.

In some embodiments, suitable glycol ether compounds are characterized as having log P (that is, partition coefficient when octanol and water are tested) of about −2 to 0, for example about −1 to 0, or −0.7 to 0. Log P is the logarithm of the ratio of the concentrations of an un-ionized solute in two solvents; when one of the solvents is water and the other is a non-polar solvent, then the log P value is also known as a measure of lipophilicity. When the non-polar solvent is octanol, Log P is the partition coefficient.

Solubility of the ether compounds in aqueous or oil-based systems can be predicted several ways, including HLB (hydrophilic-lipophilic balance) and OHLB (organic hydrophilic-lipophilic balance) values. HLB is most useful for predicting a solvent's solubility in water, and OHLB is most useful for predicting oil/water partitioning of solvents. The two scales run counter each other with respect to hydrophilicity. In some embodiments, the ether compounds suitable for use herein have HLB of about 5 to 10, such as about 6 to 9, or about 6 to 10, or about 7 to 10, or about 7 to 9. In some embodiments, the ether compounds suitable for use herein have an OHLB of about 10 to 21, such as about 11 to 21, or about 10 to 20, or about 10 to 19, or about 10 to 18, or about 10 to 17, or about 10 to 16, or about 11 to 16.

The HLB scale was derived initially for surfactants and provides a means of comparing the relative hydrophilicity of amphiphilic molecules. HLB values are also relevant for solvents with pseudo-surfactant qualities, such as glycol ethers. Complete water solubility occurs at HLB of about 7.3. Solvents with HLB values above this mark are completely miscible with water, while those below this value are only partially soluble in water. In some embodiments, the ether compounds or the additives of the invention are soluble in water to at least 0.1 wt % at 20° C. and up to completely miscible in water at 20° C. (that is, any ratio of an ether compound or additive and water form a solution). In some embodiments the glycol ether compounds or additives are soluble in water at between about 1 wt % and 30 wt % at 20° C., for example about 5 wt % to 25 wt %, or about 5 wt % to 20 wt %, or about 10 wt % to 30 wt %, or about 15 wt % to 30 wt %, or about 20 wt % to 30 wt % soluble in water at 20° C.

The glycol ether compounds useful in the PIC of the invention are characterized as liquids at 20° C., and as having boiling points in excess of 100° C. at atmospheric pressure. The melting points of the ether compounds are generally 20° C. or less at atmospheric pressure, for example about 20° C. to −100° C., or about 15° C. to −80° C., or about −40° C. to about −100° C., or about −30° C. to −90° C. at atmospheric pressure. The boiling points of the ether compounds are greater than 100° C. at atmospheric pressure, for example about 100° C. to 300° C. at atmospheric pressure, or about 100° C. to 280° C., or about 100° C. to 250° C., or about 120° C. to 300° C., or about 150° C. to 300° C., or about 120° C. to 250° C. at atmospheric pressure. The ether compounds are further characterized as having low vapor pressure at temperatures of about 20° C. or less, such as less than about 10 mm Hg or less, about 6 mm Hg or less.

In some embodiments, particularly effective additives comprise, consist essentially of, or consist of, ethylene glycol methyl ether (e.g., ethylene glycol monomethyl ether), ethylene glycol ethyl ether, ethylene glycol butyl ether (e.g., ethylene glycol monobutyl ether), diethylene glycol methyl ether, diethylene glycol ethyl ether, diethylene glycol butyl ether, ethylene glycol hexyl ether, diethylene glycol hexyl ether, propylene glycol methyl ether, propylene glycol propyl ether, propylene glycol butyl ether, dipropylene glycol methyl ether, dipropylene glycol propyl ether, dipropylene glycol butyl ether, tripropylene glycol methyl ether, tripropylene glycol butyl ether, or a combination of two or more thereof.

The foregoing ether compounds have the following properties, wherein all properties are measured at ambient pressure unless otherwise specified. All are liquids at 20° C.

ethylene glycol methyl ether, bp=124° C.; mp=−85° C.; vapor pressure=6.17 mm Hg at 20° C.

ethylene glycol ethyl ether, bp=135° C.; mp=−90° C.; vapor pressure=3.8 mm Hg at 20° C.

ethylene glycol butyl ether, bp≈170.7° C.; mp=−75° C.; vapor pressure=10 mm Hg at 20° C.

ethylene glycol hexyl ether, bp=208° C.; mp=−45° C.; vapor pressure=0.05 mm Hg at 20° C.

diethylene glycol methyl ether, bp=194° C.; mp=−70° C.; vapor pressure=0.2 mm Hg at 20° C.

diethylene glycol ethyl ether, bp=202° C.; mp=−76° C.; vapor pressure=0.12 mm Hg at 20° C.

diethylene glycol butyl ether, bp=231° C.; mp=−68° C.; vapor pressure=30 mm Hg at 20° C.

diethylene glycol hexyl ether, bp=260° C.; mp=−40° C.; vapor pressure=0.001 mm Hg at 20° C.

propylene glycol methyl ether, bp=120° C.; mp=−97° C.; vapor pressure=8.7 mm Hg at 20° C.

propylene glycol propyl ether, bp≈150° C.; mp=−80° C.; vapor pressure=4.5 mm Hg at 20° C.

propylene glycol butyl ether, bp=171° C.; mp<−75° C.; vapor pressure=0.85 mm Hg at 20° C.

dipropylene glycol methyl ether, bp=190° C.; mp=−80° C.; vapor pressure=0.28 mm Hg at 20° C.

dipropylene glycol propyl ether, bp=213° C.; mp=−75° C.; vapor pressure=0.08 mm Hg at 20° C.

dipropylene glycol butyl ether, bp=230° C.; mp<−75° C.; vapor pressure=0.04 mm Hg at 20° C.

tripropylene glycol methyl ether, bp=243° C.; mp=−78° C.; vapor pressure=0.01 mm Hg at 20° C.

tripropylene glycol butyl ether, bp=274° C.; mp=−75° C.; vapor pressure=0.002 mm Hg at 20° C.

The glycol ether compound(s) of the additive may be present in the PIC in an amount of about 1 wt % to about 90 wt % of the PIC, or about 5 wt % to about 75%, or about 10 wt % to about 50 wt %, or about 1 wt % to 90 wt %, or about 1 wt % to 80 wt %, or about 1 wt % to 70 wt %, or about 1 wt % to 60 wt %, or about 1 wt % to 50 wt %, or about 1 wt % to 40 wt %, or about 1 wt % to 30 wt %, or about 1 wt % to 20 wt %, or about 1 wt % to 10 wt %, or about 2 wt % to about 10 wt %, or about 2 wt % to about 5 wt %, or about 5 wt % to 90 wt %, or about 5 wt % to 75 wt %, or about 10 wt % to 75 wt %, or about 25 wt % to 75 wt %, or about 30 wt % to 70 wt %, or about 33 wt % to 67 wt %, or about 25 wt % to 40 wt %, or about 55 wt % to 70 wt %, or about 40 wt % to 60 wt %, or about 65 wt % to 90 wt %, or about 70 wt % to 90 wt % of the PIC.

Additives Having One or More Glycol Ethers and an Additional Component Providing Synergistic Effect to Depress a Solidification Point of a PIC It has been discovered that certain, not all, glycol ethers can depress PIC solidification points. Specifically, certain combinations and ratios of additive components and additives having one or more glycol ether components are able to depress the solidification point of PICs. Such solidification point depression allows the PICs to flow and remain stable solutions at temperatures of −40° C. and below, sufficient to allow the PICs to be pumped in extremely cold temperatures in oilfields. In some embodiments, one or more additional synergistic components are present in the PIC and/or additive in an amount effective to activate and/or enhance the one or more glycol ether components of the additive. Such synergistic components in the additive and/or PIC may include a fatty $C_8$-$C_{30}$ alcohol; a second glycol ether and refined petroleum solvent (e.g., HAN); a low molecular weight $C_1$-$C_7$ alcohol and an aromatic solvent, or combinations of any of the foregoing. In some embodiments, the synergistic component(s) in additives or PICs may enable (e.g., activate and/or enhance) the glycol ether compound to depress the solidification point of the PIC as disclosed below.

Glycol Ether Enhancement with One or More Fatty Alcohols

In some embodiments, low levels (e.g., below about 2000 ppm) of one or more non-polymeric alcohols can be used as a synergistic component to enable and/or enhance glycol ethers as solvents in PICs to maintain the PI polymer in stable solution and depress the solidification point of the PICs below −40° C. Suitable fatty alcohols may include linear, branched, and/or aromatic alkanols. Suitable fatty alcohols may be high molecular weight, $C_8$-$C_{30}$, alcohols (e.g., $C_8$-$C_{24}$ alcohols) with $C_{18}$-$C_{24}$ alcohols showing particular suitability. In some embodiments, suitable fatty alcohols may include low molecular weight, $C_7$ or less, alcohols. Nonlimiting examples of alcohols include methanol, ethanol, propanol, isopropanol, n-butanol, sec-butanol, tert-butanol, hexanol, 2-ethylhexanol, octanol, decanol, dodecanol, tetradecanol, hexadecanol, octadecanol, eicosanol, benzyl alcohol, phenol, and mixtures thereof. Surface-active fatty alcohols that have been ethoxylated, propoxylated, or ethoxylated and propoxylated are not considered as alcohols or as glycol ethers for the purposes of this disclosure.

Depending on the specific nature of the alcohol, the PI, and/or the glycol ether, the amount of fatty alcohol required to enable or enhance the glycol ether and the PIC composition to be a free-flowing stable liquid at a selected temperature (e.g., −40° C.) may vary. The amount of alcohol may range from 0.001 wt % to about 10 wt % of the additive or PIC, or about 0.01 wt % to about 5 wt %, or about 0.02 wt % to about 2 wt %, 0.1 wt % to about 3 wt %, or about 0.5 wt % to about 2 wt %, or about 1 wt % to about 3 wt %, about 2 wt % to about 4 wt %, or about 3 wt % to about 5 wt %, or about 5 wt % to about 10 wt %, 0.001 wt % to about 1 wt %, or about 0.5 wt % to about 2.5 wt %, or about 0.5 wt % to about 1.5 wt %, 1.5 wt % to about 3.5 wt %, or less than about 10 wt %, or less than about 5 wt %, or less than about 2 wt % in the additive or PIC. In some embodiments, the one or more alcohols used to activate or enhance the glycol ether in the additive may be present in the additive or in the PIC in a concentration of less than about 5000 ppm of the additive of PIC, such greater than 0 ppm to about 5000 ppm, about 5 ppm to about 2000 ppm, about 50 ppm to about 2000 ppm, about 100 ppm to about 1000 ppm, about 300 ppm to about 700 ppm, about 50 ppm to about 500 ppm, about 400 ppm to about 600 ppm, about 700 ppm to about 1500 ppm, about 800 ppm to about 1200 ppm, about 1000 ppm to about 2000 ppm, about 1500 ppm to about 2500 ppm, about 1000 ppm, about 500 ppm, about 750 ppm, about 250 ppm, about 100 ppm, or greater than about 100 ppm, or less than 2000 ppm of the additive or the PIC.

The amount of glycol ether present in combination with the one or more alcohols used to activate and/or enhance the glycol ether in an additive or PIC may vary from about 1 wt % to about 90 wt % of the additive or PIC, or about 5 wt % to about 75%, or about 10 wt % to about 50 wt %, or about 1 wt % to 90 wt %, or about 1 wt % to 80 wt %, or about 1 wt % to 70 wt %, or about 1 wt % to 60 wt %, or about 1 wt % to 50 wt %, or about 1 wt % to 40 wt %, or about 1 wt % to 30 wt %, or about 1 wt % to 20 wt %, or about 1 wt % to 10 wt %, or about 2 wt % to about 10 wt %, or about 2 wt % to about 5 wt %, or about 5 wt % to 90 wt %, or about 5 wt % to 75 wt %, or about 10 wt % to 75 wt %, or about 25 wt % to 75 wt %, or about 30 wt % to 70 wt %, or about 33 wt % to 67 wt %, or about 25 wt % to 40 wt %, or about 55 wt % to 70 wt %, or about 40 wt % to 60 wt %, or about 65 wt % to 90 wt %, or about 70 wt % to 90 wt % of the additive or PIC. Notwithstanding that wt % of the amount of glycol ether (or other components of the PICs herein) present may differ drastically when the wt % is calculated from the wt % of the PIC as opposed to the wt % of the additive, the embodiments herein contemplate both amounts.

The amount of PI used in PICs having one or more fatty alcohols used to activate and/or enhance the glycol ether compound(s) may vary from about 1 wt % to about 80 wt % of the PIC, or about 3 wt % to about 60 wt %, or about 10 wt % to about 20 wt %, or about 1 wt % to 70 wt %, or about 1 wt % to 60 wt %, or about 1 wt % to 50 wt %, or about 1 wt % to 40 wt %, or about 1 wt % to 30 wt %, or about 1 wt % to 20 wt %, or about 1 wt % to 10 wt %, or about 1 wt % to 5 wt %, or about 2 wt % to about 10 wt %, or about 2 wt % to about 5 wt %, or about 5 wt % to 90 wt %, or about 5 wt % to 75 wt %, or about 10 wt % to 75 wt %, or about 25 wt % to 75 wt %, or about 15 wt % to 35 wt %, or about 20 wt % to 40 wt %, or about 25 wt % to 50 wt %, or about 5 wt % to 25 wt %, or about 5 wt % to 15 wt %, or about 10 wt % to 25 wt %, or about 15 wt % to 20 wt %, 1 wt % to 20 wt % PI, or about 3 wt % to 20 wt %, or about 5 wt % to 20 wt %, or about 7 wt % to 20 wt %, or about 8 wt % to 12 wt % PI in the PIC.

In an embodiment, a PIC having a one or more alcohols used to activate and/or enhance the glycol ether additive therein may include about 50 wt % glycol ether, about 40 wt % naphtha, about 5 wt % of an esterified alpha-olefin maleic/anhydride copolymer and about 5 wt % of one or more surfactants, and about 500 ppm of a fatty alcohol (e.g., octadecanol).

Synergy of Glycol Ethers and Refined Petroleum Distillates Such as Naphtha in Additives and PICs Having the Same It has been discovered that certain ratios and combinations of specific glycol ethers and refined petroleum distillates such as HAN in PICs unexpectedly result in depressed solidification points for the PICs, while other ratios and/or combinations (and even the individual components of the additive(s)) do not exhibit a depressed solidification point. For example (as shown in table 8 below), PICs having combinations of ethylene glycol butyl ether, ethylene glycol methyl ether (2-methoxy ethanol), and HAN additives therein show varying flow results at −40° C. Additionally, the specific glycol ether(s) which depress the PIC solidification temperature, and the ratio of the glycol ether(s) to the PI polymer, may vary with the specific chemical structure of the PI polymer. In some embodiments, the additive may include a (first) glycol ether. In some embodiments, an additive may include at least a first glycol ether and a second glycol ether. In some embodiments, the additive may include more than two glycol ethers. The glycol ether(s) may be selected from any of the glycol ethers disclosed herein and such glycol ether(s) may be different from another glycol ether used therewith. In some embodiments, the additive may include a synergistic amount of refined petroleum distillate or solvent such as naphtha (e.g., HAN). For example, an additive may include a synergistic amount of a first glycol ether, a second glycol ether and a Petroleum distillate therein. In an embodiment, an additive may include ethylene glycol butyl ether, ethylene glycol methyl ether, and HAN.

In some embodiments, the first glycol ether may be present in the additive in an amount of about 0 wt % to about 90 wt % of the additive, such as about 10 wt % to about 75 wt %, or about 25 wt % to about 75 wt %, or about 30 wt % to about 67 wt %, or about 40 wt % to about 60 wt %, or about 50 wt % to about 90 wt %, or about 60 wt % to about 80 wt %, or about 50 wt % to about 75 wt %, or about 10 wt % to about 30 wt %, or about 70 wt % to about 90 wt %, or about 20 wt % to about 30 wt %, or about 45 wt % to about 55 wt %, or about 70 wt % to about 80 wt %, or less than about 90 wt % of the additive. In some embodiments, about one half, or about one third, or about one quarter, or ranges having endpoints of any of the above values may represent the amount of the first glycol ether present in a PIC (e.g., when the additive is diluted in other components of a PIC such as the Standard Formulation disclosed below). In such embodiments, the balance of the additive may include substantially only refined petroleum distillates or solvent (e.g., HAN), or may include one or more additional glycol ethers (e.g., the second glycol ether) and refined petroleum distillate or solvent. Additionally, the additive may optionally include one or more surfactants, stabilizers, preservatives, biocides, or other synergistic components (e.g., alcohols) as disclosed herein.

In some embodiments, the second glycol ether may be present in the additive in an amount of about 0 wt % to about 90 wt % of the additive, such as about 10 wt % to about 75 wt %, or about 25 wt % to about 75 wt %, or about 30 wt % to about 67 wt %, or about 40 wt % to about 60 wt %, or about 50 wt % to about 90 wt %, or about 60 wt % to about 80 wt %, or about 50 wt % to about 75 wt %, or about 10 wt % to about 30 wt %, or about 70 wt % to about 90 wt %, or about 20 wt % to about 30 wt %, or about 45 wt % to about 55 wt %, or about 70 wt % to about 80 wt %, or less than about 90 wt % of the additive. In some embodiments, about one half, or about one third, or about one quarter, or ranges having endpoints of any of the above values may represent the amount of the second glycol ether present in a PIC (e.g., when the additive is diluted in other components of a PIC such as the Standard Formulation disclosed below). In such embodiments, the balance of the additive may include substantially only refined petroleum distillate or solvent, or may include one or more additional glycol ethers (e.g., the first glycol ether as disclosed above) and a refined petroleum distillate solvent, where the relative amounts of each component of the additive do not exclude the remaining component(s) of the additive. Additionally, the additive may optionally include one or more surfactants, stabilizers, preservatives, biocides, or other synergistic components (e.g., alcohols) as disclosed herein.

In some embodiments, a refined petroleum distillate or solvent may be present in the additive in an amount of about 0 wt % to about 90 wt % of the additive, such as about 10 wt % to about 75 wt %, or about 25 wt % to about 75 wt %, or about 30 wt % to about 67 wt %, or about 40 wt % to about 60 wt %, or about 50 wt % to about 90 wt %, or about 60 wt % to about 80 wt %, or about 50 wt % to about 75 wt %, or about 10 wt % to about 30 wt %, or about 70 wt % to about 90 wt %, or about 20 wt % to about 30 wt %, or about 5 wt % to about 55 wt %, or about 5 wt % to about 40 wt %, or about 15 wt % to about 35 wt %, or about 20 wt % to about 40 wt %, or about 30 wt % to about 50 wt %, or about 45 wt % to about 55 wt %, or about 70 wt % to about 80 wt %, or less than about 60 wt %, or less than about 90 wt % of the additive. The above values may represent about one half, or about one third, or about one quarter, or ranges having endpoints of any of the above values may represent of the total amount of refined petroleum distillate or solvent in a PIC (e.g., when diluted in other components of a PIC such as the Standard Formulation disclosed below). In some embodiments, the balance of the additive may include one or more glycol ethers (e.g., the first and second glycol ethers as disclosed above) in any of the respective amounts disclosed herein. Additionally, the additive may optionally include one or more surfactants, stabilizers, preservatives, biocides, or other synergistic components (e.g., alcohols) as disclosed herein.

It has been discovered that specific total amounts and ratios of one or more glycol ethers with HAN in PICs result in solidification point depression effective to allow PICs to flow at −40° C. and below. For example, in some embodiments, an additive having one or more glycol ethers and a refined petroleum distillate (e.g., HAN) may be formed and mixed into a PIC. In such embodiments, the combined amount of glycol ether(s) may be 1 wt % to about 80 wt % of the PIC, such as about 20 wt % to about 60 wt %, about 30 wt % to about 70 wt %, about 10 wt % to about 40 wt %, about 20 wt % to about 40 wt %, about 30 wt % to about 50 wt %, about 35 wt % to about 60 wt %, about 15 wt % to about 35 wt %, about 10 wt % to about 25 wt %, about 25 wt % to about 40 wt %, about 40 wt % to about 60 wt %, about 50 wt % to about 70 wt %, about 50 wt % to about 60 wt %, about 60 wt % to about 70 wt %, or about 50 wt % to about 80 wt %, or less than about 80 wt %, or about 25 wt %, or about 34 wt %, or about 37.5 wt %, or about 43.5 wt % of the PIC. In an embodiment, the total amount of glycol ether(s) to HAN in a PIC that remains a stable liquid at −40° C. may be about 1:1 or less, such as about 1:3, or about 3.4:5.6, or about 2:3, or about 2.6:6.5, or about 3.7:5.2, or about 4.2:4.6, or ranges including any combination of the foregoing values as upper and lower bounds. In an embodiment, the ratio of ethylene glycol monobutyl ether to HAN in a PIC that remains a stable liquid at −40° C. may be about 1:1 or less (or about 2:1 in an additive present in a PIC), such as about 3.7:4.6, or about 2.5:5.2, or about 1.2:6:5, or about 1.2:5:3, or about 1.7:5.6, or about 1:8.

In some embodiments, a total glycol ether(s) to HAN ratio (e.g., mL:mL or mg:mg of components) in an additive that maintains a PIC (and the PI polymer therein) as a stable liquid at −40° C. may be about 1:1 to 10:1, or 1:1 to 5:1, or 1:1 to 3:1, or about 2:1. In some embodiments, a ratio of first glycol ether to HAN in an additive may range from about 1:8 to about 8:1, such as about 1:5 to about 5:1, or about 1:3 to about 3:1 depending on the specific glycol ether(s) and HAN. For example, a ratio of 1:3 ethylene glycol methyl ether to HAN in an additive may result in a flowing sample at −40° C. when present in a PIC. A ratio of 3:1 ethylene glycol methyl ether to HAN in an additive may also result in a flowing sample at −40° C., and also in a 1:1 ratio when present a PIC. In another embodiment, a 3:1 ratio of ethylene glycol butyl ether may result in a flowing PIC sample at −40° C. when present in a PIC, while sample PICs including pure ethylene glycol butyl ether and a 1:1 and 1:3 ratio of ethylene glycol butyl ether to HAN may be solidified at −40° C.

In some embodiments, a ratio (e.g., mL:mL:mL or mg:mg:mg of components) of first glycol ether to HAN to second glycol ether in an additive capable of reducing a solidification point of a PIC may range from 8:1:1 to 1:1:8 to 1:4:1, such as about 6:1:1 to 1:1:6 to 1:2:1, 4:1:1 to 1:1:4 to 1:1:1. Put another way, in a ternary additive, the ratio of first glycol ether:petroleum distillate or solvent:second glycol ether may be (1-6):(1-2):(1-6), such as about (1-3):(1-2):(1-3). For example, a ratio of 2:1:1 ethylene glycol butyl ether to HAN to ethylene glycol methyl ether in an additive present in a PIC may result in a flowing sample at −40° C. A ratio of 1:2:1 ethylene glycol butyl ether to HAN to ethylene glycol methyl ether in an additive present in a PIC may result in a flowing sample at −40° C., and/or a 1:1:2 or 1:1:1 ratio. A ratio of 6:1:1 ethylene glycol butyl ether to HAN to ethylene glycol methyl ether in an additive present in a PIC may result in a flowing sample at −40° C. In an embodiment, in an additive having a 1:1:6 ratio present in a PIC may result in a flowing sample at −40° C., while a 1:6:1 ratio does not flow. The additives and ratios thereof disclosed above may be mixed in a 1:1 ratio with a PIC formulation (Standard Formulation disclosed below) having a PI polymer, one or more refined petroleum distillates or solvents, and one or more surfactants. In such embodiments, the ratios of the additive components may be adjusted according to the content of the PIC formulation. For example, the a 1:1 dilution of any of the above additives with the Standard Formulation may result in a correspondingly lower glycol ether to HAN ratio due to the HAN content of the Standard Formulation.

Synergy of Glycol Ethers with Low Molecular Weight Alcohols and Refinery Distillates in PICs and Additives It has been discovered that certain ratios and combinations of specific glycol ethers, low molecular weight solvents (e.g., low molecular weight alcohols), refinery distillates (e.g., aromatic refined petroleum distillates such as xylene, toluene, or the like), and low polarity solvents (e.g., HAN) in additives unexpectedly result in stable liquid PIC compositions at −40° C. (e.g., depressed solidification points), while other ratios and/or combinations (and even the individual components of the additive(s)) solidify at −40° C. For example (as shown in table 9 below), PICs having combinations of ethylene glycol butyl ether, toluene, and methanol additives therein exhibit varying flow characteristics at −40° C. In some embodiments, additives present in the PICs may include one more glycol ethers, such as at least two glycol ethers, or at least three glycol ethers. The glycol ether(s) may be selected from any of the glycol ethers disclosed herein.

In some embodiments, one or more (e.g., two) of the glycol ethers may be present in the additive in an amount of about 0 wt % to about 60 wt % of the additive, such as about 1 wt % to about 60 wt %, or about 10 wt % to about 60 wt %, or about 25 wt % to about 50 wt %, or about 30 wt % to about 60 wt %, or about 40 wt % to about 60 wt %, or about 45 wt % to about 55 wt %, or about 20 wt % to about 40 wt %, or about 5 wt % to about 20 wt %, or about 5 wt % to about 15 wt %, or about 20 wt % to about 30 wt %, or about 15 wt % to about 35 wt %, or about 10 wt % to about 30 wt %, or less than about 60 wt % of the additive. In some embodiments, about one half, or about one third, or about one quarter, or ranges having any of the above values as endpoints may represent the amount of the one or more of the glycol ethers present in a PIC. In some embodiments, the balance of the additive may include one or more refinery distillates (e.g., toluene) and/or a low molecular weight alcohol (e.g., methanol, ethanol, etc.). In some embodiments, the additive may include one or more additional glycol ethers (e.g., a second glycol ether). In some embodiments, the additive may optionally include one or more surfactants, preservatives, stabilizers, or biocides as disclosed herein.

In some embodiments, an additive, such as an additive having a glycol ether and a low molecular weight alcohol therein, may include a refinery distillate, such as an aromatic or aliphatic refined petroleum distillate. Suitable refinery distillates may include toluene, benzene, xylene, heavy aromatic solvents (e.g., a $C_5$ or greater refinery distillate or a $C_9$ or greater refinery distillate), mixtures having any of the foregoing, or combinations of any of the foregoing. In some embodiments, the refinery distillate may be present in the additive in an amount of about 0 wt % to about 90 wt % of the additive, such as about 10 wt % to about 75 wt %, or about 25 wt % to about 75 wt %, or about 30 wt % to about 67 wt %, or about 40 wt % to about 60 wt %, or about 50 wt % to about 90 wt %, or about 60 wt % to about 80 wt %, or about 50 wt % to about 75 wt %, or about 10 wt % to about 30 wt %, or about 70 wt % to about 90 wt %, or about 20 wt % to about 30 wt %, or about 45 wt % to about 55 wt %, or about 70 wt % to about 80 wt %, or less than about 80 wt % of the additive. In some embodiments, about one half, or about one third, or about one quarter, or ranges having endpoints of any of the above values may represent the amount of the refinery distillates (e.g., aromatic solvent(s)) present in a PIC (e.g., when the additive is diluted in other components of a PIC such as the Standard Formulation disclosed below). In some embodiments, the balance of the additive may include one or more glycol ethers (e.g., any of the glycol ethers disclosed herein) and/or a low molecular weight solvent (e.g., low molecular weight alcohol), in any of the amounts disclosed herein. In some embodiments, the additive may optionally include one or more surfactants, preservatives, stabilizers, or biocides as disclosed herein.

In some embodiments, an additive, such as an additive having a glycol ether and a refinery distillate (e.g., an aromatic solvent) therein, may include a low molecular weight solvent, such as a low molecular weight alcohol. Suitable low molecular weight alcohols comprise, consist essentially of or consist of $C_1$-$C_7$ alcohols such as methanol, ethanol, a propanol (e.g., n-propanol, isopropanol), a butanol (e.g., tert-butanol, isobutanol), a pentanol, mixtures having any of the foregoing, or combinations of any of the foregoing. In some embodiments, the low molecular weight solvent may be present in the additive in an amount of about 0 wt % to about 90 wt % of the additive, such as about 10 wt % to about 75 wt %, or about 25 wt % to about 75 wt %, or about 30 wt % to about 67 wt %, or about 40 wt % to about 60 wt %, or about 50 wt % to about 90 wt %, or about 60 wt % to about 80 wt %, or about 50 wt % to about 75 wt %, or about 10 wt % to about 30 wt %, or about 70 wt % to about 90 wt %, or about 20 wt % to about 30 wt %, or about 45 wt % to about 55 wt %, or about 70 wt % to about 80 wt %, or less than about 80 wt %, or less than about 90 wt % of the additive. In such embodiments, the balance of the additive may include one or more glycol ethers (e.g., any of the glycol ethers disclosed herein) and/or an aromatic solvent, in any of the amounts disclosed herein. In some embodiments, about one half, or about one third, or about one quarter, or ranges having endpoints of any of the above values may represent the amount of the low molecular weight solvent present in a PIC (e.g., when the additive is diluted in other components of a PIC such as the Standard Formulation disclosed below). Additionally, the additive may optionally include one or more surfactants, biocides, stabilizers, or preservatives as disclosed herein.

In some embodiments, a ratio (e.g., mL:mL:mL or mg:mg:mg of components) of glycol ether to aromatic solvent to low molecular weight alcohol in an additive may range from about 0:1:10 to about 0:5:1. In some embodiments, a ratio of glycol ether to aromatic solvent to low molecular weight alcohol in an additive may range from about 1:0:10 to 1:0:2, such as about 1:0:3 depending on the specific PI polymer, specific glycol ether, specific aromatic solvent, and/or specific low molecular weight alcohol. In some embodiments, a ratio of glycol ether to aromatic solvent to low molecular weight alcohol in an additive may range from about 4:1:1 to 1:1:4, such as about 2:1:1, or 1:1:2, or 1:1:1 depending on the specific glycol ether, aromatic solvent, and low molecular weight alcohol. In some embodiments, a ratio of glycol ether to aromatic solvent to low molecular weight alcohol in an additive may range from about 1:1:1 to 1:8:1, such as about 1:6:1, depending on the specific glycol ether, aromatic solvent, and low molecular weight alcohol. For example, a ratio of 1:1:2 or 2:1:1 ethylene glycol butyl ether to toluene to methanol in an additive may result in a flowing sample at −40° C., while a 1:2:1 ratio does not.

Any of the additives disclosed herein may be added to any of the PIs or PICs disclosed herein (e.g., to the Standard Formulation disclosed below or to an alkyl phenol formaldehyde resin in a refined petroleum solvent (e.g., FloZol 2252D available from Lubrizol Corp. of Wickliffe Ohio) in various amounts or ratios. Suitable ratios of additive to PI in a PIC, or additive to PIC having only PI/petroleum distillate/surfactant, may range from about 1:20 to 20:1, such as about 1:10 to 10:1, about 1:5 to 5:1, about 1:4 to 4:1, about 1:3 to 3:1, about 1:2 to 2:1, about 3:2 to 2:3, about 1:1, or less than about 10:1, or less than about 3:1. The corresponding amounts of additive components (e.g., glycol ethers, low molecular weight alcohols, etc.) in the resulting mixtures may be diluted according to the ratios of components therein.

We have unexpectedly found that PICs including additives having specific components in specific amounts result in stable liquids that flow at −40° C. and have the polymer solubilized therein (e.g., be substantially free of observable precipitate or solids therein). Stated differently, an aliquot of a PIC having the additives disclosed herein will observably flow at least at one temperature between 0° C. and −40° C. when a vessel containing the PIC is tipped on its side. Further, the additives of the invention display boiling points far exceeding 100° C. Since the additives have boiling points of greater than 100° C., and in many embodiments greater than 200° C., the additives provide minimal contribution to hazardous conditions caused by buildup of pressure within a storage container or other sealed vessel when exposed to temperatures up to 60° C.

In some embodiments, the PICs of the invention are characterized as having Brookfield viscosity of about 5 cP to 1000 cP at −40° C., when measured at a shear rate of 10 s$^{-1}$ using a Brookfield viscometer equipped with a cup and bob, DIN spindle size 21 (viscometer equipment obtained from the Brookfield Engineering Laboratories of Middleboro, Mass.). For example, in some embodiments, the PIC compositions of the invention are characterized as having Brookfield viscosity at −40° C. and 10 s$^{-1}$ of about 5 cP to 900 cP, or about 5 cP to 800 cP, or about 5 cP to 700 cP, or about 5 cP to 600 cP, or about 5 cP to 500 cP, or about 5 cP to 400 cP, or about 5 cP to 300 cP, or about 5 cP to 200 cP, or about 5 cP to 100 cP, or about 10 cP to 1000 cP, or about 15 cP to 1000 cP, or about 20 cP to 1000 cP, or about 25 cP to 1000 cP, or about 30 cP to 1000 cP, or about 40 cP to 1000 cP, or about 50 cP to 1000 cP, or about 60 cP to 1000 cP, or about 70 cP to 1000 cP, or about 80 cP to 1000 cP, or about 90 cP to 1000 cP, or about 100 cP to 1000 cP, or about 10 cP to 500 cP, or about 20 cP to 500 cP, or about 10 cP to 250 cP, or about 20 cP to 250 cP, or about 10 cP to 200 cP, or about 20 cP to 200 cP, or about 10 cP to 100 cP, or about 20 cP to 100 cP.

In some embodiments, a PIC composition may specifically exclude one or more of any of the glycol ethers disclosed herein, a fatty alcohol, a low molecular weight solvent (e.g., a low molecular weight alcohol or an analog thereof), one or more refined petroleum distillates or solvents (HAN, toluene, etc.), one or more of any of the surfactants disclosed herein, a biocide, a preservative, or stabilizer.

Kits Including PIC Compositions

A kit comprising one or more nonaqueous liquid compositions is provided. The kit may include one or more nonaqueous liquid compositions; one or more containers configured to store, transport, mix, or dispense the one or more nonaqueous liquid compositions; and optionally, instructions for use of the nonaqueous liquid composition.

The one or more nonaqueous liquid compositions of the kit may include one or more of any of the PIC compositions and/or any components thereof (e.g., extra additive(s)) disclosed herein. For example, the kit may include a PIC composition comprising, consisting essentially of, or consisting of a solubilized paraffin inhibiting polymer and a non-polymeric glycol ether compound in a nonaqueous liquid (e.g., solution). The one or more nonaqueous liquid compositions of the kit are or may be used to form stable solutions at temperatures ranging from about 60° C. to about −40° C. The PIC composition may include any of the PICs, additives, surfactants, stabilizers, biocides, etc., disclosed herein. The non-polymeric glycol ether compound may include any of the non-polymeric glycol ether compounds disclosed herein.

The kit includes one or more containers configured to hold the nonaqueous liquid compositions at temperatures between about 60° C. and −40° C. The one or more containers maybe configured to store, transport, mix, or dispense the one or more nonaqueous liquid compositions. The one or more containers may comprise, consist essentially of, or consist of a bottle, a drum, a tank, can, or any other container suitable to hold a fluid composition therein. The one or more containers may be constructed of metal (e.g., steel), a polymer (e.g., polypropylene), or any other material suitable to resist corrosion from the fluid composition stored therein.

The kit may include instructions for use of the nonaqueous liquid composition. The instructions may include directions detailing how to mix, store, transport, dispense, or clean the nonaqueous liquid composition. For example, the instructions may include directions detailing how much of the liquid composition should be used in a specific crude oil source based upon the paraffin content therein. Such instructions may include a table detailing the relative amount of the nonaqueous liquid composition to be used per unit time, per unit volume of the crude oil source, or per unit volume of paraffin in the crude oil source.

Methods of Making PICs

One or more of the additives disclosed herein may be added to a mixture of a PI polymer, a refined petroleum distillate or solvent (e.g., HAN), and one or more surfactants, to form a PIC having a solidification point at or below about −40° C. The one or more additives may be added to the PI polymer after the PI polymer is mixed with the petroleum distillate (or solvent) and/or one or more surfactants, or may be added while the PIC is being formed. In some embodiments, any of the PICs disclosed herein may be formed (e.g., admixed together) at a single point in time or the additive may be admixed with the PI polymer (or a PI, petroleum distillate, surfactant mixture) in the field. In some embodiments, one or more components of the additive may be supplemented or added to the PIC in the field responsive to environmental conditions. In some embodiments, one or more components of the PIC may be mixed together prior to transportation and/or storage of the PIC. In some embodiments, the additive is added to the PIC prior to the addition of the PIC to crude oil.

Methods of Using PIC Compositions

The PICs herein are usefully added to a source of crude oil or another unrefined petroleum source at a concentration typically targeting about 50 ppm to 1000 ppm of the PI. Examples of unrefined petroleum sources may include transfer piping, storage tanks, and transport vessels. Unrefined petroleum is crude oil which has not yet been broken down into its component parts at an oil refinery. In this respect, the PIC behaves as intended and with the same beneficial effect as conventional PIC. However, in some embodiments, since the additives may usefully enable a higher PI concentration than is possible for conventional PIC, a lower rate of pumping, pouring, dripping, spraying etc. of the PIC can be employed to achieve the target PI concentration in the petroleum source. That is, a lower dosing of the pipeline or other system to transport or store crude oil would then be required.

While each component of an additive or PIC may individually be a solid at −40° C., a principal benefit of the additives is their ability to allow the PIC (encompassing a combination of PI polymer, one or more additives, surfactants, etc.) to be a stable mixture and flow at temperatures as low as −40° C. Such stable mixtures and flow properties facilitate pouring or pumping of the PIC from a storage container or vessel into contact with a crude oil source requiring paraffin inhibition. Thus, in embodiments, a method of the invention includes forming a nonaqueous liquid composition (PIC) comprising, consisting essentially of, or consisting of a PI polymer, a petroleum distillate or solvent, one or more surfactants, and one or more additives; storing the composition in an enclosed container at a first temperature between about −40° C. and 60° C.; removing the composition from the container at a second temperature between about −40° C. and 60° C.; and applying the composition to a crude oil (unrefined petroleum) source. In embodiments, the removing and the applying are accomplished using a mechanical pump. In embodiments, the first temperature, the second temperature, or both are between about −40° C. and 0° C., or about −40° C. to −10° C., or about −40° to −20° C., or about −40° C. to −30° C. It will be understood that storing and removing are carried out over a variable range of temperatures, and in particular storage temperatures often vary during the storage period. The duration of storage may also vary from about 1 day to five years, such as about 2 days to 1 year, or about 1 week to 6 months, or about 2 weeks to 4 months, or about 1 to 2 months. Such storage may take place under various temperature conditions. Storage may take place under sustained temperature conditions for various durations. For example, storing may extend through the winter and/or summer season. Accordingly, storage may take place at −40° C. to 0° C. (e.g., −40° C.) for months (e.g., 1 hour to 6 months or 1 week to 5 months) in some regions, or may take place at temperatures of as high as about 60° C. for months (e.g., 1 hour to 7 months or 1 week to 3 months) in some regions. Thus, the first temperature of the method is suitably measured at any point during storage, wherein the temperature during at least some period of storage is within the stated range. In some embodiments the applying is sufficient to contact the crude petroleum source with about 50 ppm or more of the PI, such as about 50 ppm to 1000 ppm of the PI, or less than about 2000 ppm of the PI.

The method of applying the PIC to the crude oil source is not particularly limited. One of skill will appreciate that crude oil additives such as paraffin inhibitors are conventionally added by using available equipment including e.g. pipes, mixers, pumps, tanks, injection ports, and the like. Aside from the increased concentration of PI polymer in the PIC of the invention, addition of the PIC to a petroleum source is usefully accomplished using conventional equipment and the same equipment with which an operator in the field is acquainted; that is, no special steps or other procedures are required to use the PIC of the invention. In some embodiments, the PIC is applied to one or more subterranean hydrocarbon recovery (oil well) locations, such as downhole or on the backside using capillary string, gas lift, slip stream or other methods, at the wellhead, or at any other point downstream of the reservoir.

WORKING EXAMPLES

Working Examples 1-5

Formulations having various levels of ethylene glycol monomethyl ether (2-methoxy ethanol) additive were tested in a PIC, the PIC including of a mixture of a 50 wt % solids formaldehyde-phenolic resin PI and a low polarity solvent including heavy aromatic naphtha ("HAN"). Each of working examples 1-5 was then cooled in a freezer set to −40° C. and tested for solidification (e.g., flow). Table 1 below shows the relative proportions of the PI, ethylene glycol monomethyl ether additive, and low polarity solvent (as the balance), and the effect on the solidification point of the PI.

TABLE 1

Compositions and observed results for working examples 1-5.

| Working Example | Alkyl phenol formaldehyde Resin (wt %) | 2-Methoxy ethanol (wt %) | Solidification Point |
| --- | --- | --- | --- |
| 1 | 25 | 0 | +10° C. |
| 2 | 25 | 2 | <−40° C. |
| 3 | 25 | 2 | <−40° C. |
| 4 | 40 | 5 | <−40° C. |
| 5 | 50 | 5 | <−40° C. |

As shown, working example 1, having no additive therein, solidified at about 10° C., while each of working examples 2-5, having a glycol ether (2-methoxy ethanol) therein, exhibited a solidification point below −40° C. Without being bound to a particular theory, it is currently believed that the 2-methoxy ethanol in working examples 2-5 was able to disrupt inter-chain hydrogen bonding between polar sites on the formaldehyde-phenolic resin polymer, minimizing the expected gel and solid formation from aggregation of the formaldehyde-phenolic resin polymer chains.

Paraffin Inhibition of Working Example 4

Working example 4 (having a balance of 55 wt % HAN) was tested with waxy crude oil concentrate for paraffin inhibition. Crude oil samples having two different concentrations—250 ppm and 500 ppm—of working example 4 therein were cold finger tested. The cold finger test quantitates the amount of paraffin wax deposited from 30° C. crude oil placed on a 5° C. metal surface. A control sample having no PIC was also cold finger tested for comparison to the samples having 250 ppm and 500 ppm of the test formula of working example 4.

TABLE 2

Compositions and cold finger results for working example 4.

| Formulation | Wt (g) of Wax Deposit | wt % Deposit Reduction |
| --- | --- | --- |
| none | 1.415 | — |
| 250 ppm test formula | 0.78 | 45 |
| 500 ppm test formula | 0.64 | 55 |

As shown in Table 2, 250 ppm and 500 ppm of working example 4 reduced the paraffin deposition by 45 wt % and 55 wt %, respectively, versus the untreated waxy crude oil control.

General Procedures

Formulations of PICs with various glycol ether compound containing additives were blended. PI polymers were employed in the blends. In each case, the indicated amount of PI polymer added is the amount of the polymer as supplied in a solvent (and not the actual weight of the dry polymer (actives)).

A standard PIC formulation ("Standard Formulation") was formed for the following working examples, the Standard Formulation includes about 79 wt % of HAN, about 1.5 wt % nonylphenol ethoxylate ("NPE") 9.5, about 6 wt % dodecylbenzene sulfonic acid ("DDBSA"), about 3.5 wt % cocodiethanolamide, and about 10 wt % of esterified $C_{20}$ or greater alpha olefin/maleic anhydride copolymer (60% active).

Using the Standard composition, various tests were carried out to determine the solidification properties of the Standard Composition and its components. The various individual components of the Standard Formulation were evaluated alone for solidification at −40° C. in the conventional HAN solvent at the same concentration as each component would have been used in the Standard Formulation.

TABLE A

Binary HAN and Standard Formulation component compositions and physical states of the same at −40° C.

| Working Example | Weight % HAN | Additive | Physical State at −40° C. |
|---|---|---|---|
| A1 | 90.0 | 10% Esterified $C_{20}$+ alpha olefin/maleic anhydride copolymer (60% active) | solid |
| A2 | 96.5 | 3.5% cocodiethanolamide | liquid |
| A3 | 98.5 | 1.5% Nonylphenol Ethoxylate | liquid |
| A4 | 94.0 | 6% dodecylbenzene sulfonic acid | liquid |

As the data in Table A illustrates, the combination of HAN with the NPE in working example A3 gave a liquid at −40° C.; cocodiethanolamide with HAN in working example A2 gave a liquid at −40° C.; and combination of the dodecylbenzene sulfonic acid with HAN gave a liquid at −40° C. However, the combination of the PI polymer with HAN in working example 1 gave a solid at −40° C. The term "solid" in the Tables herein refers to solidification of the entire sample into one homogeneous block.

The Standard Formulation was tested to determine if various levels of HAN in combination therewith affected the solidification point of the Standard Formulation. The Standard Formulation was diluted with various amounts of additional HAN to form working examples S1-S4, each having a 5 mL total volume and a 4:1 to 1:4 ratio of Standard formulation to HAN, respectively.

TABLE B

Standard formulation to added HAN compositions and physical states of the same at −40° C.

| Working Example | mL Standard Formulation | mL Added HAN | Physical State at −40° C. |
|---|---|---|---|
| Control | 5 | 0 | Solid |
| S1 | 4 | 1 | Solid |
| S2 | 3 | 2 | Solid |
| S3 | 2 | 3 | gel |
| S4 | 1 | 4 | Solid |

When the Standard Formulation alone in the Control was evaluated at −40° C., it formed a solid. As table B demonstrates, dilution of the Standard Formulation with additional HAN was insufficient to achieve a liquid at −40 C. Each of working examples S1, S2, and S4 formed a solid and working example S3 formed a gel, which for the purposes of this disclosure is not a liquid (e.g., does not flow).

Ethylene glycol n-butyl ether additive (e.g., solvent) was tested with the individual components of the Standard Formula. Various mixtures having one Standard Formulation component and ethylene glycol n-butyl ether additive were formed and tested.

TABLE C

Ethylene glycol n-butyl ether and Standard formulation component compositions and physical states of the same at −40° C.

| Working Example | Weight % ethylene glycol n-butyl ether | Weight % Standard formulation Component | −40° C. Physical State |
|---|---|---|---|
| E1 | 90.0 | 10% Esterified C20+ alpha olefin/maleic anhydride copolymer (60% active) | solid |
| E2 | 96.5 | 3.5% cocodiethanolamide | solid |
| E3 | 98.5 | 1.5% Nonylphenol Ethoxylate | solid |
| E4 | 94.0 | 6% dodecylbenzene sulfonic acid | liquid |

In Table C, ethylene glycol n-butyl ether was tested with the individual components of the Standard Formula. As demonstrated in Table C, only the combination of ethylene glycol n-butyl ether additive with dodecylbenzene sulfonic acid in working example E4 was liquid at −40° C. In other words, the combination of ethylene glycol n-butyl ether individually with cocodiethanolamide in working example E2, with nonylphenol ethoxylate (NPE) in working example E3, and with the PI polymer in working example E1, each formed a solid at −40° C.

In most of the working examples below, the Standard Formulation was formed and the additives were added thereto to form a PIC. Various PICs were made and placed into sample bottles for observation and to test for solidification point depression.

For solidification point depression/flow testing, the sample bottles were placed in a freezer set to a temperature of −40° C. for between 12 and 18 hours. The sample bottles were removed from the freezer and observed, the bottles were tipped onto their side in order to observe flow of the contents.

The compositions tested herein are said to "flow" at the indicated temperature when the PIC of each working example, vertically at rest on a substantially horizontal surface the cylindrical container (radius 1 inch, height 2 inches), flows observably within about 10 seconds when tipped to a substantially horizontal position. This amount of flow is known to be sufficient to indicate that the composition is pourable or pumpable for use in the field, where such concentrates are applied to one or more crude oil transportation or storage systems.

Working Examples 6-85

It has been discovered that certain glycol ether species and/or certain ratios thereof are effective to depress the solidification point of certain PICs. Testing was carried out with a number of PICs having various glycol ether compound containing additives therein. The Standard Formulation was mixed with various additives having various types and amounts of glycol ether compounds. Testing was carried out to determine the relative suitability of one glycol ether compound and/or PIC to another. One to five mL of the Standard Formulation was added to a sample bottle with an aliquot of various glycol ethers to form a 5, 10, 15, 20, 25, 30, or 35 mL (total volume) sample. After addition of the specific glycol ethers to the Standard Formulation, the sample bottles were placed in a freezer set to −40° C. for 12-18 hours and tested (e.g., tipped on a side to observe for the presence of flow, gelation, or solidification) to determine if the solidification point depressed below about −40° C. A control sample having only the Standard Formulation was also tested. Glycol ethers derived from ethylene glycol and propylene glycol were tested with the Standard Formulation, the results are summarized below in Tables 3 and 4.

TABLE 3

PIC compositions having ethylene glycol derived ethers therein. The formula for the ethylene glycol derived ethers used in samples 6-51 was $R(OCH_2CH_2)_nOH$, where R was the number of carbon atoms (Ph = phenyl group) in the alkyl terminus of the respective ethers.

| Working Example # | R | n | mL Standard Formulation | mL Glycol Ether | State at −40° C. |
|---|---|---|---|---|---|
| Control | — | — | 5 | 0 | solid |
| 6 | 1 | 1 | 1 | 4 | liquid |
| 7 | 1 | 1 | 2 | 3 | liquid |
| 8 | 1 | 1 | 3 | 2 | solid |
| 9 | 1 | 1 | 4 | 1 | solid |
| 10 | 2 | 1 | 1 | 4 | liquid |
| 11 | 2 | 1 | 2 | 3 | liquid |
| 12 | 2 | 1 | 3 | 2 | liquid |
| 13 | 2 | 1 | 4 | 4 | liquid |
| 14 | 4 | 1 | 5 | 5 | liquid |
| 15 | 4 | 1 | 5 | 10 | liquid |
| 16 | 4 | 1 | 5 | 15 | liquid |
| 17 | 4 | 1 | 5 | 20 | liquid |
| 18 | 4 | 1 | 5 | 25 | liquid |
| 19 | 4 | 1 | 5 | 30 | liquid |
| 20 | 6 | 1 | 5 | 5 | solid |
| 21 | 6 | 1 | 5 | 10 | liquid |
| 22 | 6 | 1 | 5 | 15 | liquid |
| 23 | 6 | 1 | 5 | 20 | liquid |
| 24 | 6 | 1 | 5 | 25 | liquid |
| 25 | 6 | 1 | 5 | 30 | liquid |
| 26 | Ph | 1 | 1 | 4 | solid |
| 27 | Ph | 1 | 2 | 3 | solid |
| 28 | Ph | 1 | 3 | 2 | solid |
| 29 | Ph | 1 | 4 | 1 | solid |
| 30 | 1 | 2 | 1 | 4 | liquid |
| 31 | 1 | 2 | 2 | 3 | liquid |
| 32 | 1 | 2 | 3 | 2 | solid |
| 33 | 1 | 2 | 4 | 1 | solid |
| 34 | 2 | 2 | 1 | 4 | liquid |
| 35 | 2 | 2 | 2 | 3 | liquid |
| 36 | 2 | 2 | 3 | 2 | liquid |
| 37 | 2 | 2 | 4 | 1 | liquid |
| 38 | 4 | 2 | 1 | 4 | liquid |
| 39 | 4 | 2 | 2 | 3 | liquid |
| 40 | 4 | 2 | 3 | 2 | liquid |
| 41 | 4 | 2 | 4 | 1 | solid |
| 42 | 6 | 2 | 5 | 5 | liquid |
| 43 | 6 | 2 | 5 | 10 | liquid |
| 44 | 6 | 2 | 5 | 15 | liquid |
| 45 | 6 | 2 | 5 | 20 | liquid |
| 46 | 6 | 2 | 5 | 25 | liquid |
| 47 | 6 | 2 | 5 | 30 | liquid |
| 48 | 4 | 3 | 1 | 4 | liquid |
| 49 | 4 | 3 | 2 | 3 | liquid |
| 50 | 4 | 3 | 3 | 2 | liquid |
| 51 | 4 | 3 | 4 | 1 | liquid |

As table 3 demonstrates, not all glycol ethers derived from ethylene glycol behaved the same when added to the Standard Formulation. For example, working examples 6 and 7 (containing 2-methoxyethanol) were liquid when the additive was present in a 4:1 or 3:2 ratio with the Standard Formulation, while the 1:4 or 2:3 ratios of working examples 8 and 9 were solidified at −40° C. Working examples 10-13 (containing 2-ethoxyethanol), working examples 14-19 (containing ethylene glycol monobutyl ether), working examples 34-37 (containing diethylene glycol ethyl ether), working examples 42-47 (containing diethylene glycol hexyl ether), and working examples 48-51, each containing a 1:4 through 4:1 ratio of additive to the Standard Formulation (5:1 and 6:1 for working examples 46 and 47) were liquid at −40° C. Working examples 30 and 31 (containing diethylene glycol methyl ether) were liquid at −40° C. when glycol ether additive was present in a 4:1 or 3:2 ratio with the Standard Formulation, while the 1:4 and 2:3 ratios of working examples 32 and 33 were solidified. Further, working examples 42-45 (containing a phenyl group) were all solidified at −40° C. Working example 20 (containing ethylene glycol monohexyl ether) having a longer alkyl terminus (C6) than working examples 6-19 was solidified at −40° C. in a 1:1 ratio with the standard formulation while working examples 21-25 having 2:1 through 6:1 ratios remained a liquid at −40° C. Working examples 38-40 (containing diethylene glycol butyl ether) were liquid at −40° C., while the 4:1 ratio of example 41 was solidified. The control sample was solidified at −40° C.

TABLE 4

PIC compositions having propylene glycol derived ethers therein. The formula of the ethylene glycol derived ethers for working examples 52-85 was $R(OCH_2CHCH_3)_nOH$, where R was the number of carbon atoms (Ph = phenyl group) in the alkyl terminus of the respective ethers.

| Working Example # | R | n | mL Standard Formulation | mL Glycol Ether | State at −40° C. |
|---|---|---|---|---|---|
| 52 | 1 | 1 | 1 | 4 | liquid |
| 53 | 1 | 1 | 2 | 3 | liquid |
| 54 | 1 | 1 | 3 | 2 | liquid |
| 55 | 1 | 1 | 4 | 1 | solid |
| 56 | 3 | 1 | 1 | 4 | liquid |
| 57 | 3 | 1 | 2 | 3 | liquid |
| 58 | 3 | 1 | 3 | 2 | solid |
| 59 | 3 | 1 | 4 | 1 | solid |
| 60 | 4 | 1 | 1 | 4 | liquid |
| 61 | 4 | 1 | 2 | 3 | solid |
| 62 | 4 | 1 | 3 | 2 | solid |
| 63 | 4 | 1 | 4 | 1 | solid |
| 64 | Ph | 1 | 1 | 4 | solid |
| 65 | Ph | 1 | 2 | 3 | solid |
| 66 | Ph | 1 | 3 | 2 | solid |
| 67 | Ph | 1 | 4 | 1 | solid |
| 68 | 1 | 2 | 1 | 4 | liquid |
| 69 | 1 | 2 | 2 | 3 | liquid |
| 70 | 1 | 2 | 3 | 2 | liquid |
| 71 | 1 | 2 | 4 | 1 | solid |
| 72 | 3 | 2 | 1 | 4 | liquid |
| 73 | 3 | 2 | 2 | 3 | liquid |
| 74 | 3 | 2 | 3 | 2 | solid |
| 75 | 3 | 2 | 4 | 1 | solid |
| 76 | 4 | 2 | 1 | 4 | liquid |
| 77 | 4 | 2 | 2 | 3 | liquid |
| 78 | 4 | 2 | 3 | 2 | solid |
| 79 | 4 | 2 | 4 | 1 | solid |
| 80 | 1 | 3 | 3 | 2 | liquid |
| 81 | 1 | 3 | 4 | 1 | solid |
| 81 | 4 | 3 | 1 | 4 | liquid |
| 83 | 4 | 3 | 2 | 3 | liquid |
| 84 | 4 | 3 | 3 | 2 | solid |
| 85 | 4 | 3 | 4 | 1 | solid |

As table 4 demonstrates, not all glycol ethers derived from propylene glycol behaved the same when added to the Standard Formulation. For example, working examples 52-54 (containing 2-methoxypropanol) were liquid when the glycol ether was present in a 2-4:1-3 ratio with the Standard Formulation, while the 1:4 ratio of working example 55 resulted in a solidified PIC at −40° C. Working examples 56-57 (containing propylene glycol propyl ether) were liquid when the glycol ether was present in a 4:1 or 3:2 ratio with the Standard Formulation, while the 1:4 or 2:3 ratio of working examples 58 and 59 resulted in a solidified PIC at −40° C. Working example 60 (containing propylene glycol butyl ether) was liquid when the glycol ether was present in a 4:1 ratio with the Standard Formulation, while the 3:2, 2:3, and 1:4 ratios of working examples 61-63 resulted in a solidified PIC at −40° C. Working examples 64-67 (containing glycol ethers having phenyl groups) all solidified at −40° C. Working example 71 (containing dipropylene glycol methyl ether) was solidified at −40° C. when the glycol ether was present in a 1:4 ratio with the Standard Formulation, while the 2:3, 3:2, and 4:1 ratios of working examples 67-70 resulted in liquid (e.g., flowing) PICs at −40° C. Working examples 72 and 73 (containing dipropylene glycol propyl ether) were liquid at −40° C. when the glycol ether was present in a 4:1 or 3:2 ratio with the Standard Formulation, while the 1:4 or 2:3 ratio of working examples 74 and 75 resulted in a solidified PIC at −40° C. Working examples 76 and 77 (containing dipropylene glycol butyl ether) were liquid when the glycol ether was present in a 4:1 or 3:2 ratio with the Standard Formulation, while the 1:4 or 2:3 ratio of working examples 78 and 79 resulted in a solidified PIC at −40° C. Working example 80 (containing tripropylene glycol methyl ether) was liquid when the glycol ether was present in a 2:3 ratio with the Standard Formulation, while the 1:4 ratio of working example 81 resulted in a solidified PIC at −40° C. Working examples 82 and 83 (containing tripropylene glycol butyl ether) were liquid when the glycol ether was present in a 4:1 or 3:2 ratio with the Standard Formulation, while the 1:4 or 2:3 ratio of working examples 84 and 85 resulted in a solidified PIC at −40° C.

While the amounts of glycol ether additive in the PICs in table 4 (and other tables herein) were tested and are listed as mL values for working examples 6-84, the inventors believe that the same values and ratios expressed as wt % would result in identical or substantially similar solidification points and/or or solidification point depression as those working examples listed in mL values. The same is true for all subsequent amounts of additives and PICs listed in mL herein below.

Working Examples 86-91

It has been discovered that specific ratios of glycol ethers with HAN in PICs result in solidification point depression effective to allow some PICs to remain a stable mixture and flow at −40° C. Tables 5 and 6 below show some of the effects of replacement of HAN with glycol ethers. The respective working examples (working examples 86-91) were formed, placed in bottles, and stored in a freezer set at −40° C. for 12-18 hours. After storage, the bottles were placed on their sides and the working examples were observed for flow, indicating a liquid, gel, or solid for each working example. The relative compositions, including materials and wt % of each are shown below in table 5. Approximately 10 g of each of samples 86-91 was made and tested.

TABLE 5

Weight % of raw materials in working examples 86-91 and corresponding state after placement in −40° C. freezer.

| PIC Composition Components | Weight % of Raw Materials in Working Examples 86-91 | | | | | |
|---|---|---|---|---|---|---|
| | Working Example 86 | Working Example 87 | Working Example 88 | Working Example 89 | Working Example 90 | Working Example 91 |
| HAN | 39.5 | 52.67 | 26.33 | 39.5 | 52.7 | 26.3 |
| Ethylene Glycol Butyl Ether | 39.5 | 26.33 | 52.67 | 0 | 0.0 | 0.0 |
| Ethylene Glycol Hexyl Ether | 0.0 | 0 | 0 | 39.5 | 26.3 | 52.7 |
| Nonylphenol Ethoxylate | 1.5 | 1.5 | 1.5 | 1.5 | 1.5 | 1.5 |
| DDBSA | 6.0 | 6 | 6 | 6 | 6.0 | 6.0 |
| Coco-diethanol-amide | 3.5 | 3.5 | 3.5 | 3.5 | 3.5 | 3.5 |
| Esterified $C_{20}+$ Alpha Olefin/Maleic Anhydride Copolymer | 10.0 | 10 | 10 | 10 | 10 | 10 |
| Physical State at −40° C. | Solid, opaque | Solid, opaque | Liquid, cloudy | Solid, opaque | Solid, opaque | Solid, opaque |

As shown in table 5, only working example 88 having nearly 50 wt % of ethylene glycol butyl ether (e.g., 1:1 additive to Standard Formulation and 2:1 additive to HAN ratios) was liquid after storage at −40° C., while all of working examples 89-91 were solidified. Notably, working example 91 had the same ratio of glycol ether to HAN of working example 88 but solidified after storage in the freezer. Such difference in solidification point may be due to the difference in glycol ether additive species in working examples 88 and 91—ethylene glycol butyl ether and ethylene glycol hexyl ether, respectively.

Working Examples 92-94

Further testing was carried out to determine if varying amounts of ethylene glycol butyl ether around the 2:1 ethylene glycol butyl ether to HAN threshold resulted in a changed of the physical state of the PIC composition at −40° C. PIC compositions of progressively more glycol ether and less PI were tested. Table 6 is a comparison of various amounts of ethylene glycol butyl ether and components of a PIC composition and the effects thereof on solidification of the PIC compositions at −40° C. Each of samples 92-94 were mixed, stored and tested as disclosed above with reference to table 5. In working example 93, 10 wt % more ethylene glycol monobutyl ether is used than in working example 92. In working example 94, 25 wt % more ethylene glycol monobutyl ether is used than in working example 92.

TABLE 6

Comparison of varying amounts of ethylene glycol monobutyl ether and HAN in PIC compositions and the effects on solidification point.

| PIC Composition Components | Standard Formulation | Working Example 92 | Working Example 93 | Working Example 94 |
|---|---|---|---|---|
| HAN | 79.0 | 26.1 | 26.6 | 27.2 |
| Ethylene glycol butyl ether | 0.0 | 52.9 | 53.9 | 55.3 |
| Nonylphenol Ethoxylate | 1.5 | 1.5 | 1.4 | 1.3 |
| Dodecylbenzene Sulfonic Acid | 6.0 | 6.0 | 5.6 | 5.0 |
| Cocodiethanolamide | 3.5 | 3.5 | 3.2 | 2.9 |
| Esterified $C_{20}+$ Alpha Olefin/Maleic Anhydride Copolymer | 10.0 | 10.0 | 9.3 | 8.3 |
| Physical State at −40° C. | solid | cloudy liquid | cloudy liquid | cloudy liquid |

Table 6 validates the data shown in table 5, showing that ethylene glycol butyl ether depresses the solidification point of the PI polymer in the Standard Formulation/PIC mixture (e.g., keeps the PI polymer in solution (liquid)) at temperatures of at least −40° C. The observed opaque liquids remained stable in solution with no observable precipitate. That is to say the PI polymer and other formula components remained in solution.

Working Examples 95-100

Further testing on ethylene glycol hexyl ethers was carried out. Tables 5 and 7 show that systems having diethylene glycol hexyl ether may also be a stable liquid when stored at −40° C. For the examples in Table 7, a 5 mL Standard Formulation as described above was diluted 1:1 with ethylene glycol butyl ether, and 1 mL of diethylene glycol hexyl ether was added. The sample was stored in a freezer set to −40° C. overnight and the sample was tested for solidification as described above. The PICs remained a (cloudy) liquid.

For working examples 95-100, the Standard Formulation was mixed with various amounts of diethylene glycol hexyl ether, stored at −40° C., and tested for solidification as disclosed above.

TABLE 7

Diethylene glycol hexyl ether content in PIC compositions and observations thereof at −40° C.

| Working Example # | Amount of Standard Formulation (mL) | Amount of Diethylene Glycol Hexyl Ether (mL) | State at −40° C. |
|---|---|---|---|
| 95 | 5 | 5 | liquid, translucent |
| 96 | 5 | 10 | liquid, cloudy |
| 97 | 5 | 15 | liquid, opaque |
| 98 | 5 | 20 | liquid, cloudy |
| 99 | 5 | 25 | liquid, cloudy |
| 100 | 5 | 30 | liquid, cloudy |

As shown in table 7, as higher ratios of diethylene glycol hexyl ether are used (above 1:1) with the Standard Formulation, the PIC composition remains a liquid after storage at −40° C. As the amount of diethylene glycol ether increased past a 1:1 ratio with the Standard Formation, the PICs went from translucent in working example 95 to opaque and cloudy in working examples 96-100. The opaque/cloudy solutions of working examples 96-100 maintained the PI therein in stable solution, that is, no solid was visible. Despite the cloudiness, the PI polymer in each of working examples 96-100 appears to have remained soluble enough to pass through a filter without significant loss (less than 50 wt %) of PI polymer.

Working Examples 101-119

Further testing with multicomponent additives, having one or more glycol ethers in combination with HAN, in PICs was carried out. The Standard Formulation (disclosed above) was mixed in a 1:1 ratio with the additives of working examples 101-119 detailed below. Each working example was placed in a bottle and stored for 12-18 hours in a freezer set at −40° C. After storage, each working example was placed on its side and was observed for flow or solidification as disclosed herein. The additives of working examples 101-119 include one or more glycol ethers in combination with varying amounts of HAN.

TABLE 8

Additive compositions used in a 1:1 ratio with the Standard Formulation and the solidification point test results thereof. The term "nonflowing" as used herein signifies that the sample was a solid or gel. Flowing signifies that the sample was a liquid.

| Working Example # | Ethylene Glycol Butyl Ether wt % | HAN wt % | 2-methoxy ethanol wt % | State at −40° C. |
|---|---|---|---|---|
| 101 | 100 | 0 | 0 | nonflowing |
| 102 | 75 | 25 | 0 | flowing |
| 103 | 50 | 50 | 0 | nonflowing |
| 104 | 25 | 75 | 0 | nonflowing |
| 105 | 0 | 100 | 0 | nonflowing |
| 106 | 0 | 75 | 25 | nonflowing |
| 107 | 0 | 50 | 50 | flowing |
| 108 | 0 | 25 | 75 | flowing |
| 109 | 0 | 0 | 100 | nonflowing |
| 110 | 25 | 0 | 75 | nonflowing |
| 111 | 50 | 0 | 50 | nonflowing |
| 112 | 75 | 0 | 25 | nonflowing |
| 113 | 50 | 25 | 25 | flowing |
| 114 | 25 | 50 | 25 | flowing |
| 115 | 25 | 25 | 50 | flowing |
| 116 | 75 | 12 | 13 | flowing |
| 117 | 12 | 75 | 13 | nonflowing |
| 118 | 12 | 13 | 75 | flowing |
| 119 | 33 | 33 | 34 | flowing |

As shown in table 8, PICs having specific combinations of one or more glycol ethers and HAN unexpectedly flow while others are solidified at −40° C. For example, a 1:1 mixture of pure ethylene glycol butyl ether with the Standard Formulation results in a solidified PIC at −40° C., while a 1:1 mixture of 75 wt % ethylene glycol butyl ether/25 wt % HAN additive to Standard Formulation unexpectedly flows at −40° C. Similarly, a 1:1 mixture of pure 2-methoxy ethanol with the Standard Formulation results in a solidified PIC at −40° C., while a 1:1 mixture of 75 wt % 2-methoxy ethanol/25 wt % HAN additive or 50 wt % 2-methoxy ethanol/50 wt % HAN additive to Standard Formulation unexpectedly flows at −40° C. Further, ternary additives mixtures having varying amounts of ethylene glycol butyl ether, HAN, and 2-methoxy ethanol resulted in flowing samples in ratios from 1-6:1-2:1-6 wt %. Specifically, ternary additive mixtures of working examples 113, 114, 115, 117, 118, and 119 resulted in flowing (liquid) samples. Specific ratios demonstrating flowing working examples included 1 2-methoxy ethanol:3 HAN, 3 2-methoxy ethanol:1 HAN, 3 ethylene glycol butyl ether:1 HAN, 1-3 2-methoxy ethanol:1-2 HAN:1-6 ethylene glycol butyl ether.

In a working example not shown on the Tables, an aliphatic alcohol ethoxylate, Genapol EP-2454 (available from Clariant International Ltd of The Woodlands Tex. in the United States of America), was substituted for HAN in the Standard Formulation. The resulting composition solidified at −40° C.

Working Examples 120-138

Further testing on multicomponent additives, having a glycol ether in combination with an aromatic solvent (toluene) and a low molecular weight alcohol (methanol), in PIC compositions was carried out. The additives of working examples 120-138 include various wt % and/or ratios of ethylene glycol butyl ether, toluene, and methanol. The Standard Formulation (disclosed above) was mixed in a 1:1 ratio with the additives of working examples 120-138 detailed below. Each working example was placed in a bottle and stored for 12-18 hours in a freezer set at −40° C. After storage, each working example was placed on its side and was observed for flow or solidification as disclosed above. The additives of working examples 120-138 include varying amounts of glycol ether, toluene, and methanol.

TABLE 9

Additive compositions of working examples 120-138 used in a 1:1 ratio with the Standard Formulation and the solidification point test results thereof.

| Working Example # | Ethylene Glycol Butyl Ether wt % | Toluene wt % | Methanol wt % | State at −40° C. |
|---|---|---|---|---|
| 120 | 100 | 0 | 0 | nonflowing |
| 121 | 75 | 25 | 0 | nonflowing |
| 122 | 50 | 50 | 0 | nonflowing |
| 123 | 25 | 75 | 0 | nonflowing |
| 124 | 0 | 100 | 0 | nonflowing |
| 125 | 0 | 75 | 25 | flowing |
| 126 | 0 | 50 | 50 | flowing |
| 127 | 0 | 25 | 75 | flowing |
| 128 | 0 | 0 | 100 | flowing |
| 129 | 25 | 0 | 75 | flowing |
| 130 | 50 | 0 | 50 | nonflowing |
| 131 | 75 | 0 | 25 | nonflowing |
| 132 | 50 | 25 | 25 | flowing |
| 133 | 25 | 50 | 25 | nonflowing |
| 134 | 25 | 25 | 50 | flowing |
| 135 | 75 | 12 | 13 | nonflowing |
| 136 | 12 | 75 | 13 | flowing |
| 137 | 12 | 13 | 75 | nonflowing |
| 138 | 33 | 33 | 34 | flowing |

As shown in Table 9, binary additives comprising toluene and methanol in working examples 125-127 resulted in flowing PIC compositions at −40° C. Further, the binary additive of working example 129 having 25 wt % ethylene glycol butyl ether and 75 wt % methanol resulted in a flowing PIC composition at −40° C. Specific ternary additives resulted in flowing samples at −40° C. Working example 132 having a 50 wt % of ethylene glycol butyl ether, 25 wt % of toluene, and 25 wt % of methanol additive flowed after storage at −40° C. (e.g., a 2:1:1 ratio). Working example 134 having 25 wt % of ethylene glycol butyl ether, 25 wt % of toluene, and 50 wt % of methanol additive flowed after storage at −40° C. (e.g., a 1:1:2 ratio). Working example 136 having 12 wt % of ethylene glycol butyl ether, 75 wt % of toluene, and 13 wt % of methanol additive flowed after storage at −40° C. (e.g., a 1:2:1 ratio). Working example 138 having 33 wt % of ethylene glycol butyl ether, 33 wt % of toluene, and 34 wt % of methanol additive flowed after storage at −40° C. (e.g., a 1:1:1 ratio). Notably, similar ratios for additive components similar to those resulting in flowing samples unexpectedly resulted in nonflowing (solidified) samples. For example, working example 137 unexpectedly solidified, despite having additives including 75 wt % of methanol, while a pure methanol or 75 wt % methanol/25 wt % toluene additive resulted in a flowing samples in working examples 128 and 129.

Specific ratios demonstrating flowing working examples included 1-2 ethylene glycol butyl ether:1 toluene:1-2 methanol and 1 ethylene glycol butyl ether:6 toluene:1 methanol.

Demonstrative of the unexpected nature of the solidification point depression in specific mixtures of specific PICs, individual solvents were tested to determine their effect on PIC solidification point depression. Testing was carried to determine which solvents solidified at −40° C. and/or depressed the solidification point of the Standard Formulation. Various solvents (e.g., refined petroleum distillates or ethylene glycol butyl ether) were added to the Standard Formulation. The amount of each of the various solvents was added in 1:4 (25 wt % of the Standard Formulation), 1:2 (50 wt % of the Standard Formulation), 1:1 (100 wt % of the Standard Formulation), and 4:1 (400 wt % of the Standard Formulation) ratios to the Standard Formulation. The additional amounts of the various solvents were added to the Standard Formulation, which was then placed in a freezer set at −40° C. overnight and tested for solidification/flow as disclosed above.

The various solvents tested include commercially available solvents such as Exxsol™ D40 solvent Exxsol™ D95 Solvent, Exxsol™ D110, aromatic solvent 150 (available under the trade name Solvesso™), and Isopar™ M, K, H, G, and L solvents, each available from ExxonMobil Chemical Company of Spring, Tex. in the United States of America. The solvents tested included aromatic solvent 195 (commercially available as MaxPure® PD 195 from Resolute Oil, LLC of League City, Tex. in the United States of America). The solvents tested included dodecyl benzene. The solvents tested included ethylene glycol, diethylene glycol, propylene glycol, dipropylene glycol, and ethylene glycol butyl ether.

Additionally, each component of the Standard formulation (α-olefin/maleic anhydride copolymer, nonylphenol ethoxylate, Cocodiethanolamide, and DDBSA) was tested with each of the various solvents alone to determine if the various solvents had an effect on the solidification point of the individual component(s) as compared to the entire Standard Formulation. The amounts of α-olefin/maleic anhydride copolymer, nonylphenol ethoxylate, Cocodiethanolamide, and DDBSA tested with each of the various solvents was the same as the ratio of each individual component to HAN in the standard formulation (e.g., 79 wt % a various solvent to 1.5 wt % nonylphenol ethoxylate, etc.).

TABLE 10

Solvents and physical states of Standard Formulations having the same.
Table 10 below lists the solvents, amounts thereof, and physical states of the solvent alone and also added as an additional component to the Standard Formulation having various amounts of the same after storage at −40° C. overnight. Table 10 also lists the individual components of the Standard Formulation which were evaluated alone for solidification at −40° C. in various solvents at the same concentration as each component would have been used in the Standard Formulation.

| Solvent Type | Pure Solvent | mL Extra Solvent:mL Standard Formulation | | | | Individual Components Tested Individually in Solvent | | | |
|---|---|---|---|---|---|---|---|---|---|
| | | 1:4 | 2:3 | 3:2 | 4:1 | α-olefin/ maleic anhydride copolymer | Nonyl- phenol- ethoxylate | Coco- diethanol- amide | DDBSA |
| Heavy Naphtha | Liquid | Solid | Solid | Solid | Solid | Solid | Solid | Solid | Liquid |
| Aromatic Solvent 150 (HAN) | Solid | | | | | | | | |
| Aromatic Solvent 195 (HAN) | Liquid | Solid | Solid | Solid | Solid | Solid | Liquid | Liquid | Liquid |
| Exxsol D40 (HAN) solvent | Liquid | Solid | Solid | Solid | Solid | Solid | Solid | Solid | Liquid |
| Exxsol D95 Solvent (HAN) | Solid | | | | | | | | |
| Exxsol D110 (HAN) | Solid | | | | | | | | |
| Dodecyl Benzene | Liquid | Solid | Solid | Solid | Solid | Solid | Liquid | Liquid | Liquid |
| Isopar M Paraffinic Solvent | Liquid | Solid | Solid | Solid | Solid | Solid | Liquid | Liquid | Liquid |
| Isopar K Paraffinic Solvent | Liquid | Solid | Solid | Solid | Solid | Solid | Liquid | Solid | Liquid |
| Isopar H Paraffinic Solvent | Liquid | Solid | Solid | Solid | Solid | Solid | Liquid | Solid | Liquid |
| Isopar G Paraffinic Solvent | Liquid | Solid | Solid | Solid | Solid | Solid | Liquid | Liquid | Liquid |
| Isopar L Paraffinic Solvent | Liquid | Solid | Solid | Solid | Solid | Solid | Liquid | Solid | Liquid |
| Ethylene glycol butyl ether | Liquid | Solid | Solid | Liquid | Liquid | Solid | Solid | Solid | Liquid |
| Ethylene glycol | Solid | | | | | | | | |
| Diethylene glycol | Solid | | | | | | | | |
| Propylene glycol | Solid | | | | | | | | |
| Dipropylene glycol | Solid | | | | | | | | |

As shown in Table 10, most of the solvents were ineffective at depressing the solidification point of the Standard Formulation. Surprisingly, no relationship was found between the solidification point of the various solvents and their impact on the solidification properties of the Standard Formulation when added as extra solvent. Notably, only a glycol ether solvent—ethylene glycol butyl ether—stabilized the Standard Formulation when added as extra solvent. The ethylene glycol butyl ether depressed the solidification point of the Standard Formulation to below −40° C. when present in 3:2 and 4:1 ratios of ethylene glycol butyl ether to Standard Formulation. Thus, Table 10 demonstrates that despite the individual additives being liquid at −40° C. in many solvents, the incorporation of those components into the Standard Formulation typically resulted in a solid at −40° C.

Working Examples 139-141

Testing was carried out to determine if a binary glycol ether and fatty alcohol additive resulted in solidification point depression in PICs that undergo cyclic exposure to cold and warm temperatures (e.g., −40° C. and room temperature respectively).

Working examples 139-141 were prepared according to the following steps. Standard Formulation (as disclosed above) was mixed with an equal amount of ethylene glycol monobutyl ether according to following schemes. The Standard Formulation of working example 139 was mixed 1:1 with ethylene glycol monobutyl ether and placed in a freezer set at −40° C. overnight. The Standard Formulation of working example 140 was stored at 140 60° C. for seven days prior to dilution with ethylene glycol monobutyl ether in a 1:1 ratio and then stored in a freezer set at −40° C. overnight. The Standard Formulation of working example 141 was mixed with octadecanol to a concentration of 500 ppm octadecanol and stored at 60° C. for seven days prior to dilution with ethylene glycol monobutyl ether in a 1:1 ratio and then placed in a freezer set at −40° C. overnight (12-18 hours). Upon removal from the freezer, each of working examples 139-141 were tested for solidification as disclosed herein.

TABLE 11

Preparation physical state of working examples 139-141 after cyclic cold and hot storage.

| Working Example # | Treatment Prior to 1:1 Dilution With Ethylene Glycol Monobutyl Ether and Storage at −40° C. | Physical State at −40° C. |
|---|---|---|
| 139 | None | liquid |
| 140 | Storage at 60° C. for 7 days | solid |
| 141 | Addition of 500 ppm octadecanol and storage at 60° C. for 7 days | liquid |

Working example 139 which had not been exposed to heat prior to being placed in the freezer, remained a liquid at −40° C. Working example 140, which had been heated to 60° C. prior to being cooled to −40 C, was solidified at −40° C. Working example 141, which had 500 ppm octadecanol added to it prior to being heated to 60° C. and subsequently cooled to −40 C, unexpectedly remained a liquid at −40° C. The solidification of working example 140 is believed to indicate that the reduced thermal stability of some PICs stored at higher temperatures (and subsequently stored at extremely low temperatures of −40° C.) may limit the ability of the additive to depress the solidification temperature under cold conditions (e.g., −40° C.). The liquid state of 141 is believed to indicate that the glycol ether can be activated and/or enhanced by a fatty alcohol such as octadecanol effective to stabilize the additive in high and low temperature storage conditions to provide solidification point depression even after long term storage at relatively higher temperatures (e.g., 60° C.).

The invention illustratively disclosed herein can be suitably practiced in the absence of any element which is not specifically disclosed herein. Additionally each and every embodiment of the invention including any individual aspects thereof, as described herein, is intended to be used either alone or in combination with any other embodiment or individual aspects thereof described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

We claim:

1. A composition comprising:
   (a) 25 to 50 wt % of an alkylphenol-formaldehyde copolymer; and
   (b) about 1 wt % to about 10 wt % of 2-methoxy ethanol;
   wherein the composition is a stable nonaqueous composition that flows at −40° C.

2. The composition of claim 1 further comprising about 1 wt % to 25 wt % of one or more anionic and/or amphoteric surfactants.

3. The composition of claim 1 further comprising a low molecular weight C1-C8 alcohol and an aromatic solvent, a fatty alcohol, naphtha, or mixtures of two or more thereof.

4. The composition of claim 3 wherein the composition comprises about 50 ppm to about 2000 ppm of the fatty alcohol.

5. The composition of claim 1 further comprising naphtha.

6. The composition of claim 1, wherein the composition comprises more than about 50% of a petroleum-based solvent selected from the group consisting of benzene, toluene, xylene, light aromatic naphtha, heavy aromatic naphtha, kerosene, pentane, hexane, heptane, octane, nonane, decane, undecane, dodecane, tridecane, tetradecane, pentadecane, hexadecane, and a combination thereof.

7. The composition of claim 1, wherein the composition does not further comprise an alcohol.

8. The composition of claim 1, wherein the concentration of the alkylphenol formaldehyde resin is 25 wt %, 40 wt %, or 50 wt %.

* * * * *